(12) United States Patent
Bae et al.

(10) Patent No.: US 12,277,207 B2
(45) Date of Patent: Apr. 15, 2025

(54) SYSTEM, APPARATUS AND METHOD FOR PROVIDING ONE-TIME QR BASED LOGISTICS STATE MANAGEMENT SERVICE

(71) Applicant: WILLOG CO., LTD., Seoul (KR)

(72) Inventors: Sung Hoon Bae, Seoul (KR); Ji Hyun Yun, Pyeongtaek-si (KR)

(73) Assignee: WILLOG CO., LTD., Seoul (KR)

( * ) Notice: Subject to any disclaimer, the term of this patent is extended or adjusted under 35 U.S.C. 154(b) by 229 days.

(21) Appl. No.: 18/058,836

(22) Filed: Nov. 25, 2022

(65) Prior Publication Data

US 2023/0334139 A1 Oct. 19, 2023

(30) Foreign Application Priority Data

Apr. 18, 2022 (KR) .................. 10-2022-0047282

(51) Int. Cl.
*G06F 21/36* (2013.01)
*G06K 19/06* (2006.01)

(52) U.S. Cl.
CPC ....... *G06F 21/36* (2013.01); *G06K 19/06037* (2013.01)

(58) Field of Classification Search
CPC .......... G06F 21/36; G06K 19/06037
See application file for complete search history.

(56) References Cited

U.S. PATENT DOCUMENTS

| | | | | |
|---|---|---|---|---|
| 11,363,427 | B2 * | 6/2022 | Volkerink | H04W 4/80 |
| 11,819,305 | B1 * | 11/2023 | Volkerink | B32B 27/36 |
| 2021/0198040 | A1 * | 7/2021 | Gil | G06Q 10/083 |
| 2022/0207473 | A1 * | 6/2022 | Freeman | G06K 7/10356 |
| 2022/0300896 | A1 * | 9/2022 | Volkerink | G06K 19/06037 |
| 2023/0359979 | A1 * | 11/2023 | Hamm | G06K 7/10366 |

FOREIGN PATENT DOCUMENTS

KR 10-1872698 B1 6/2018

\* cited by examiner

*Primary Examiner* — Frantz B Jean
(74) *Attorney, Agent, or Firm* — Studebaker Brackett PLLC

(57) ABSTRACT

The present disclosure provides a method for providing a one-time QR (OTQ) based logistics state management service, which is performed by an apparatus. The method includes the operations of: generating actual sensed data sensing at least one among temperature, acceleration, humidity, illumination, inclination, shock, and location inside a region, in which logistics are loaded, at each predetermined period through a first sensor mounted inside the region; accumulating and recording the actual sensed data generated at each predetermined period based on a predetermined storage capacity; generating and displaying the first QR code based on the actual sensed data; and generating a second QR code in a case in which data included in the first QR code exceeds the predetermined storage capacity.

10 Claims, 12 Drawing Sheets

| Pattern type | Pattern identifier | Pattern form |
|---|---|---|
| 1st pattern | P1 |  |
| 2nd pattern | P2 |  |
| 3rd pattern | P3 |  |
| ⋮ | P4 | ⋮ |
| Nth pattern | PN |  |

SYSTEM, APPARATUS AND METHOD FOR PROVIDING ONE-TIME QR BASED LOGISTICS STATE MANAGEMENT SERVICE

CROSS-REFERENCE TO RELATED APPLICATION

A claim for priority under 35 U.S.C. § 119 is made to Korean Patent Application No. 10-2022-0047282 filed on Apr. 18, 2022 in the Korean Intellectual Property Office, the entire contents of which are hereby incorporated by reference.

BACKGROUND

1. Technical Field

The present disclosure relates to a system, an apparatus, and a method for providing a one-time QR (OTQ) based logistics state management service.

2. Description of Related Art

Recently, since the number of people buying things online is increasing and long-distance transportation is facilitated due to the development of the transportation industry, the delivery amount of logistics is rapidly increasing. In addition, due to COVID-19, the delivery of vaccines has also become an important issue.

In general, In the process of distributing logistics, due to the nature of the logistics, the logistics may be damaged or spoiled by temperature, humidity, shock, etc. So, logistics with perfect quality may often not be provided to customers.

Therefore, a person delivering logistics must directly check state information of the logistics, such as temperature, humidity, shock, and the like, inside a delivery vehicle, to determine states of the logistics, write lots of paper certificates, such as certified documents or inspection reports, and the likes, including the state information, and provide them to a manager or a client.

However, it is substantially impossible to grasp and organize the states of the delivery vehicle one by one manually since the delivery amount of logistics including vaccines.

Therefore, a method capable of enhancing delivery efficiency by directly transferring state information of logistics without directly grasping state information of logistics in a delivery vehicle by a delivery person and writing a paper certificate manually is needed. In addition, a method capable of grasping state information of logistics in a delivery vehicle which delivers logistics and storing and managing lots of the grasped state information.

SUMMARY

The present disclosure has been made to solve the above-mentioned problems occurring in the prior art, and in an aspect of the present disclosure, an object of the present disclosure is to provide an apparatus, and a method for providing capable of providing state information of logistics in the form of a QR code by sensing at least one among temperature, acceleration, humidity, illumination, inclination, shock, and location, in a delivery vehicle which delivers logistics.

The aspects of the present disclosure are not limited to those mentioned above, and other aspects not mentioned herein will be clearly understood by those skilled in the art from the following description.

DETAILED DESCRIPTION

Figure 1:
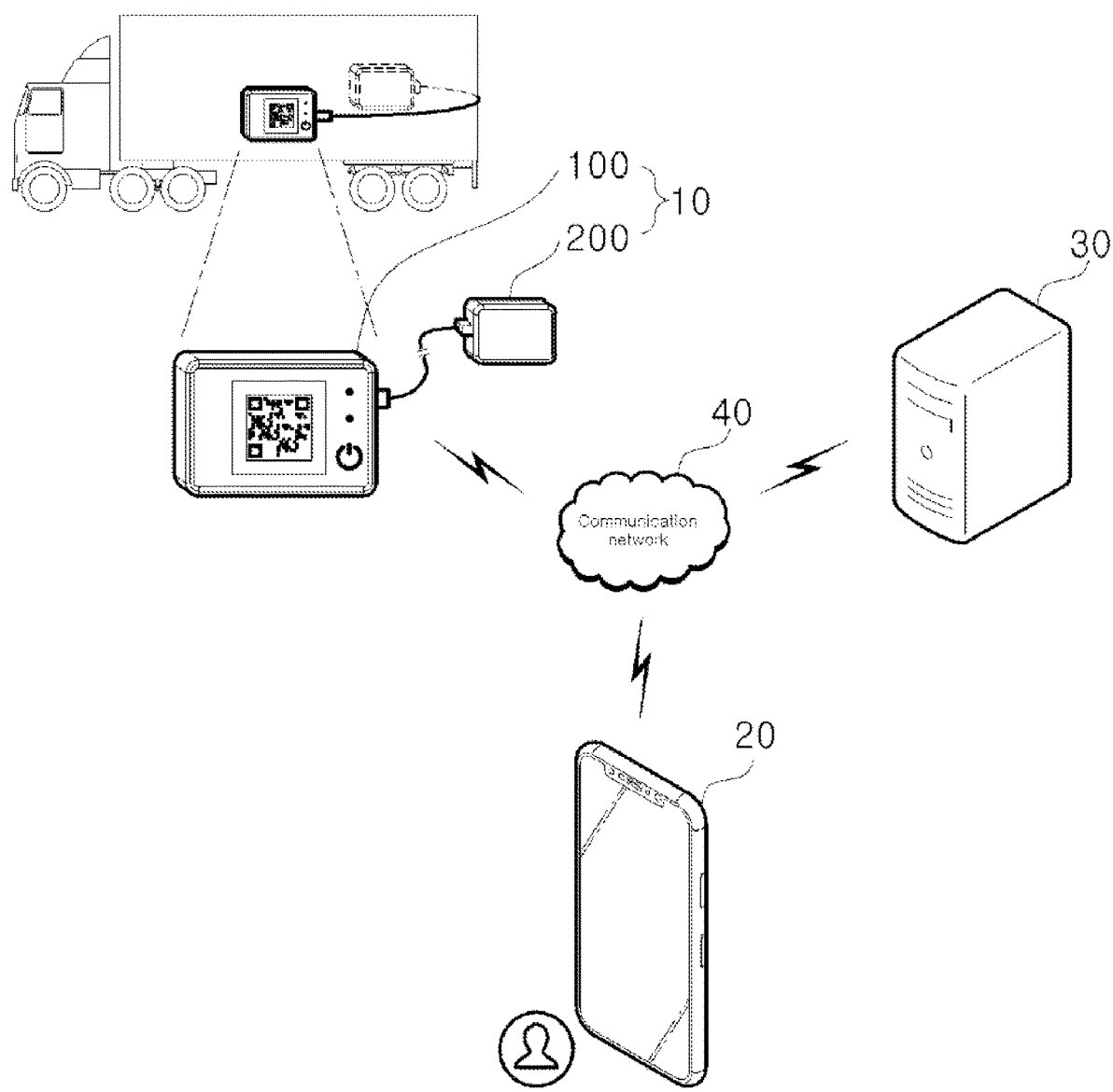
FIG. 1 is a view schematically illustrating a system 1 for providing a logistics state management service according to the present invention.

Hereinafter, activation in the present invention refers to turning on power of an apparatus (at least one among an apparatus 10, a first sensor 200, and a second sensor 120 included in the apparatus 10 which will be described hereinafter), and deactivation refers to turning off power of the apparatus or pausing a specific operation (for instance, a sensing operation) in the turn-on state. In this instance, in a case in which the apparatus in a deactivated state is reactivated, the specific operation may be resumed.

Hereinafter, the working principles and embodiments of the present disclosure will be described with reference to the accompanying drawings.

Referring to FIGS. 1 to 9, a system 1 for providing a logistics state management service of the present invention will be described. Here, the system 1 may include fewer or more components than those illustrated in FIG. 1.

The system 1 includes: an apparatus 10 for measuring the state of logistics; a terminal 20 for recognizing a two-dimensional code (e.g., QR code); a server 30 for grasping sensed data for the two-dimensional code through decoding of the two-dimensional code received from the terminal and managing the state of the logistics; a communication network 40; and an external server (not illustrated).

The system 1 senses at least one of temperature, acceleration, humidity, illumination, inclination, shock, and location within a region 3 where the logistics are loaded in a delivery vehicle 2 delivering the logistics, and provides the state information of the logistics in the form of a QR code.

Accordingly, in a case in which a user has an external terminal 20 capable of recognizing the QR code and a corresponding application, the external terminal 20 may easily recognize the QR code without a cumbersome process. Therefore, the present invention can easily, accurately and conveniently confirm the state in the delivery vehicle 2 and take necessary measures.

Here, the state information is at least one among temperature, humidity, and illumination required to store the logistics in an appropriate environment, inclination required to load the contents of the logistics without spill or drop, shock on easily breakable logistics such as glass, and a delivery location of the logistics. Necessary state information is previously set when the corresponding logistics are stored or delivered. For instance, assuming that the product is milk in a bottle, the state information of the logistics may include, for example, changes in temperature or humidity for storing the milk without spoiling, or strength of shock to prevent the bottle from breaking. It is preferable that the state information of the logistics basically includes location information indicating the location of the logistics. It is to allow a seller and a buyer to be accurately and promptly informed of a delivery location of the logistics that the seller and the buyer have managed or purchased.

Moreover, the system 1 can enhance efficiency by facilitating an integrated logistics state management service through simplification of the process of checking the state in the delivery vehicle, and minimize issue of paper certificates, such as certified documents or inspection reports, and the likes, that had to be submitted during the distribution process.

Furthermore, the system 1 is configured to enable recycling of the apparatus 10 in a case in which the delivery vehicle 2 is scrapped or changed in use, thereby having cost saving effect by reducing waste of the apparatus 10.

First, the apparatus 10 will be described with reference to FIGS. 2 and 3. Such an apparatus 10 may be provided in the shape illustrated in FIG. 2.

The apparatus 10 is detachably mounted in the delivery vehicle 2 delivering the logistics, and senses at least one among temperature, acceleration, humidity, illumination, inclination, shock, location, and a proximity state, and provides the state information in the delivery vehicle 2 in the form of a QR code.

Here, logistics refers to goods to be transported, and may be goods that need to be protected from deterioration, temperature changes, and external shock during delivery. Additionally, logistics in this specification may be referred to as transportation products, delivery products, delivery goods, or the likes. For instance, the logistics may be products, such as medicines, bio products, fresh food, and the likes.

The apparatus 10 may record the state information in a QR code and identify state information by reading the QR code through the external terminal 20 capable of recognizing the QR code.

Since the apparatus can be detachably mounted, even if being mounted on a region 3 where the logistics of the delivery vehicle 2 is loaded, the apparatus may be removed from the region 3 to be recycled in a case in which the delivery vehicle 2 is scrapped or changed in use later. Here, the region 3 in which the logistics of the delivery vehicle 2 is loaded may be a container box disposed integrally with the delivery vehicle 2 or a separable container box.

Referring to FIG. 1, it is illustrated that one apparatus 10 is installed in the region 3 of one delivery vehicle 2 in which the logistics is loaded, but it is not necessarily limited thereto. A plurality of apparatuses 10 may be installed in the region 3, and may be detachably mounted anywhere in the region 3. Alternatively, the apparatus 10 may be detachably installed on each delivery product, or may be detachably installed on a package box including a plurality of delivery products.

The apparatus 10 may include a main body 100 and a first sensor 200. Specifically, The main body 100 of the apparatus 10 is detachably mounted on the outside of the region 3 where the logistics of the delivery vehicle 2 is loaded, and the first sensor 200 of the apparatus 10 may be detachably mounted inside the region 3 where the logistics of the delivery vehicle 2 is loaded.

First, at least one first sensor 200 of the apparatus 10 is mounted inside the region 3 to sense at least one among temperature, acceleration, humidity, illumination, inclination, shock, and location inside the region 3.

Here, the main body 100 may control the driving or operation of the first sensor 200 of the apparatus 10 based on the sensed data, or perform data processing, functions, or operations related to an application program installed in the main body 100.

For example, the first sensor 200 may include at least one or more among an illumination sensor, a humidity sensor, a proximity sensor, an acceleration sensor, a G-sensor, a gyroscope sensor, a motion sensor, an infrared (IR) sensor, a finger scan sensor, an optical sensor, a ultrasonic sensor, an infrared ray sensor, an environment sensor (e.g., a barometric pressure sensor, a temperature sensor, a radiation sensor, a heat sensor, a gas sensor, etc.), a chemical sensor (e.g., a healthcare sensor, a biometric sensor, etc.), a position sensor, an ethylene sensor, a CO2 sensor, and a nitrogen sensor.

Here, the proximity sensor may be a sensor that detects the presence or absence of an object approaching a predetermined detection surface or an object existing nearby the detection surface without any mechanical contact by using electromagnetic force or infrared rays.

At least one of these sensors may be provided inside the first sensor 200.

In addition, the first sensor 200 may have a second AUX terminal 201 to be connected with the first AUX terminal 132 of the main body 100 through the AUX cable 300. Here, the first sensor 200 can be activated only when connected to a first AUX terminal 132 of the main body 100 through an AUX cable 300.

Moreover, the first sensor 200 may have a sensitivity level range different from that of the second sensor 120.

In addition, the first sensor 200 may have a sensing range optimized for managing the logistics.

For example, in a case in which when the type of the logistics is a vaccine, the first sensor 200 may have an optimized sensing range according to the type of vaccine.

That is, in a case in which the type of the vaccine is Pfizer, since Pfizer must be maintained in a temperature range of −90 to −60° C., the apparatus 100 may have the first sensor 200 capable of measuring the temperature range.

Alternatively, in a case in which the type of the vaccine is Moderna, since Moderna must be maintained in a temperature range of −20° C., the apparatus 100 may have the first sensor 200 capable of measuring the temperature range.

Therefore, the first sensors 200 having the sensing ranges different according to types of the logistics. In a case in which the sensing range is changed according to types of logistics, the first sensor 200 may be replaced with another one and may be detachably mounted in the region 3.

Next, the body 100 includes a first communication unit 110, a second sensor 120, a first input unit 130, a first display unit 140, a first memory 150, and a first processor 160. The apparatus 10 may include fewer or more components than those illustrated in FIGS. 2 and 3.

The first communication unit 110 may be one or more modules enabling wireless communication between the apparatus 10 and a wireless communication system, between the apparatus 10 and the external terminal 20, between the apparatus 10 and the server 30, and between the apparatus 10 and the external server (not illustrated). Moreover, the first communication unit 110 may include one or more modules connecting the external terminal 20 to one or more networks.

In addition, the first communication unit 110 is a module for acquiring the location (or current location) of the apparatus 10, and as a representative example thereof, there is a global positioning system (GPS) module or a wireless fidelity (WiFi) module.

For example, the main body 100 of the apparatus 10 may obtain a location using a signal transmitted from a GPS satellite through a GPS module. As another example, when utilizing a Wi-Fi module, the main body 100 of the apparatus 10 may obtain a location based on information of a wireless access point (AP) transmitting or receiving a wireless signal with the Wi-Fi module. The first communication unit 110 is not limited to directly calculating or obtaining the location of the main body 100 of the apparatus 10.

In addition, the first communication unit 110 may further include a first short-range communication unit 111 performing low-power Bluetooth (Bluetooth™ Low Energy) communication with the external terminal 20.

Moreover, the second sensor 120 may sense at least one of temperature, acceleration, humidity, illumination, inclination, shock, location, and a proximity state outside the region 3 where the logistics of the delivery vehicle 2 is loaded.

That is, the second sensor 120 may sense surrounding environment information surrounding the main body 100 of the apparatus 10 and generate a sensing signal corresponding thereto.

Here, the first processor 160 may control the driving or operation of the main body 100 of the apparatus 10 based on the sensing signal, or perform data processing, functions, or operations related to an application program installed in the apparatus 10.

For example, the second sensor 120 may include at least one or more among an illumination sensor 121, a humidity sensor 122, a proximity sensor, an acceleration sensor, a G-sensor, a gyroscope sensor, a motion sensor, an infrared (IR) sensor, a finger scan sensor, an optical sensor, a ultrasonic sensor, an infrared ray sensor, an environment sensor (e.g., a barometric pressure sensor, a temperature sensor, a radiation sensor, a heat sensor, a gas sensor, etc.), a chemical sensor (e.g., a healthcare sensor, a biometric sensor, etc.), a position sensor, an ethylene sensor, a CO2 sensor, and a nitrogen sensor.

Here, the proximity sensor may be a sensor that detects the presence or absence of an object approaching a predetermined detection surface or an object existing nearby the detection surface without any mechanical contact by using electromagnetic force or infrared rays.

The illumination sensor 121 and the humidity sensor 122 may be provided on one side surface of the main body 100. In addition, the remaining sensors may be embedded inside the main body 100.

Here, the first processor 160 may control the driving or operation of the main body 100 of the apparatus 10 based on the sensing signal depending on sensing results of the one or more sensors described above, or perform data processing, functions, or operations related to an application program installed in the apparatus 10. Accordingly, the first processor 160 may combine and utilize information sensed by at least two or more of these sensors.

The second sensor 120 can be deactivated only when the first AUX terminal of the main body and the first sensor 200 are connected through the AUX cable 300.

Furthermore, the second sensor 120 may have a sensitivity level range different from that of the first sensor 200.

The first input unit 130 is to input video information (or signals), audio information (or signals), data, or information input by a user, and includes an on/off button 131 and a first AUX terminal 132.

Additionally, the main body 100 of the apparatus 10 may include at least one first camera (not illustrated) for the first input unit 130 to input image information. The first camera (not illustrated) may process an image frame, such as a still image or a moving image, obtained by an image sensor in a photographing mode. The processed image frame may be displayed on the first display unit 140 or stored in the first memory 150. In addition, the first camera (not illustrated) may include at least one among a camera for recognizing an iris and a camera for capturing an image.

Moreover, the first input unit 130 may include at least one among a time setting button (not illustrated) for starting the apparatus 10 or controlling the screen of the first display unit 140 and an adjustment button (not illustrated) for displaying a QR code.

Here, the button may be formed as a physical hardware button or a virtual button displayed on a touch screen. The virtual button may be formed on the first display unit 140 of a touch screen type.

Furthermore, the on/off button 131 may be formed as a physical button, a touch button of a touch pad type, or a virtual button displayed on a touch screen.

Accordingly, the apparatus 10 may be turned on or turned off when the on/off button 131 is kept pressed for a first preset time (hereinafter, referred to as "long key input").

Additionally, the apparatus 10 may be initialized when a long key is input to the on/off button 131 for a second preset time. Here, the initialization means a function that all QR codes pre-stored in the apparatus 10 are deleted (in this instance, the pre-stored QR codes may be deleted after being transmitted to a preset external device), a function that a unit count is set as a default (factory reset) count, or a function that an operation mode of the apparatus 10 is set as a default (factory reset) mode. In addition, the first time (e.g., 'five seconds') may mean time shorter than the second time (e.g., 'six seconds or more').

Moreover, in a case in which the on/off button 131 is input in a state in which the illumination value measured from the illumination sensor 121 is less than a preset illumination value, the apparatus 10 may change the unit count for generating a QR code corresponding to the input method of the on/off button 131.

For example, when the user presses the on/off button 131 once while concealing the illumination sensor 122 with a finger, the unit count is changed to one minute. When the user presses the on/off button twice, the unit count is changed to three minutes. That is, based on the number of times of the on/off button 131 being pressed, the unit count may be changed to one minute, three minutes, thirty minutes, one hour, two hours, six hours, and the like.

In addition, the first AUX terminal 132 may be provided for connection with the first sensor 200 through the AUX cable 300.

The first display unit 140 may implement a touch screen by forming a mutual layer structure with the touch sensor or by being formed integrally with the touch sensor. Such a touch screen may provide an input interface between the apparatus 10 and the user, and an output interface between the apparatus 10 and the user. The first display unit 140 may display the QR code provided by the apparatus 10.

The first memory 150 may store data supporting various functions of the apparatus 10, and in particular, store QR codes. The first memory 150 may store a plurality of application programs or applications running in the apparatus 10, data and commands for operation of the apparatus 10. At least a portion of these application programs may be downloaded from the server 30 and/or an external server (not illustrated) through wireless communication. In addition, at least a portion of these application programs may exist for basic functions of the apparatus 10. Meanwhile, the application programs are stored in the first memory 150, installed on the apparatus 10, and driven by the first processor 160 to perform the operations or functions of the apparatus 10.

The first processor 160 may control general operations of the apparatus 10 in addition to operations related to the application programs. The first processor 160 may provide or process appropriate information or functions to the user by processing signals, data, information, etc. input or output through the components described above or by running application programs stored in the first memory 150.

Figure 2:
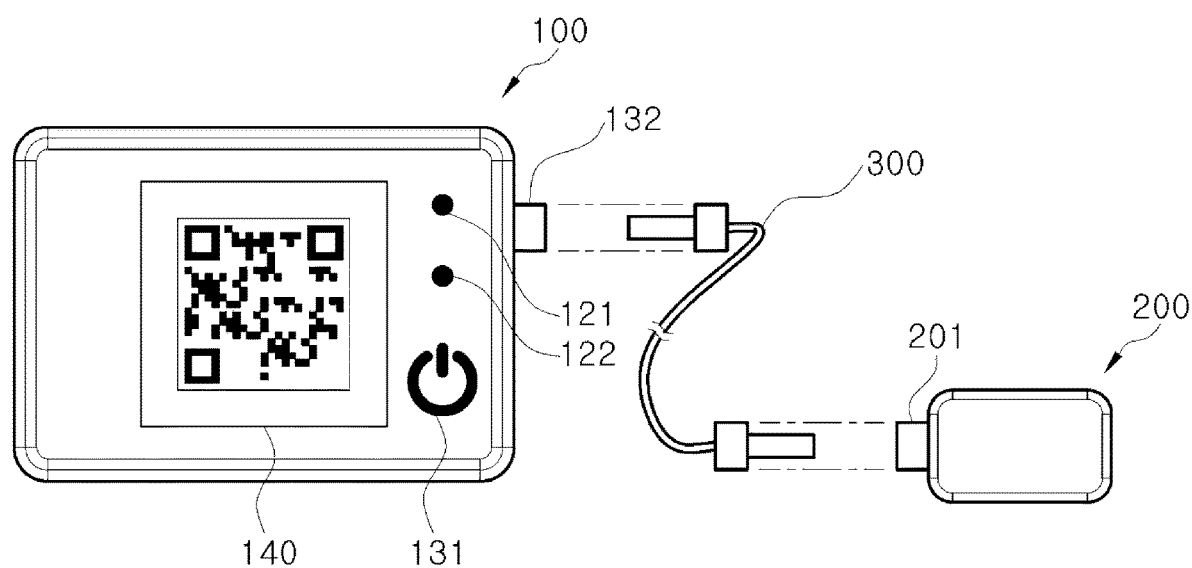
FIGS. 2 and 3 are views illustrating an apparatus 10 for generating and storing sensing data used for state management of logistics according to the present invention.
Figure 3:
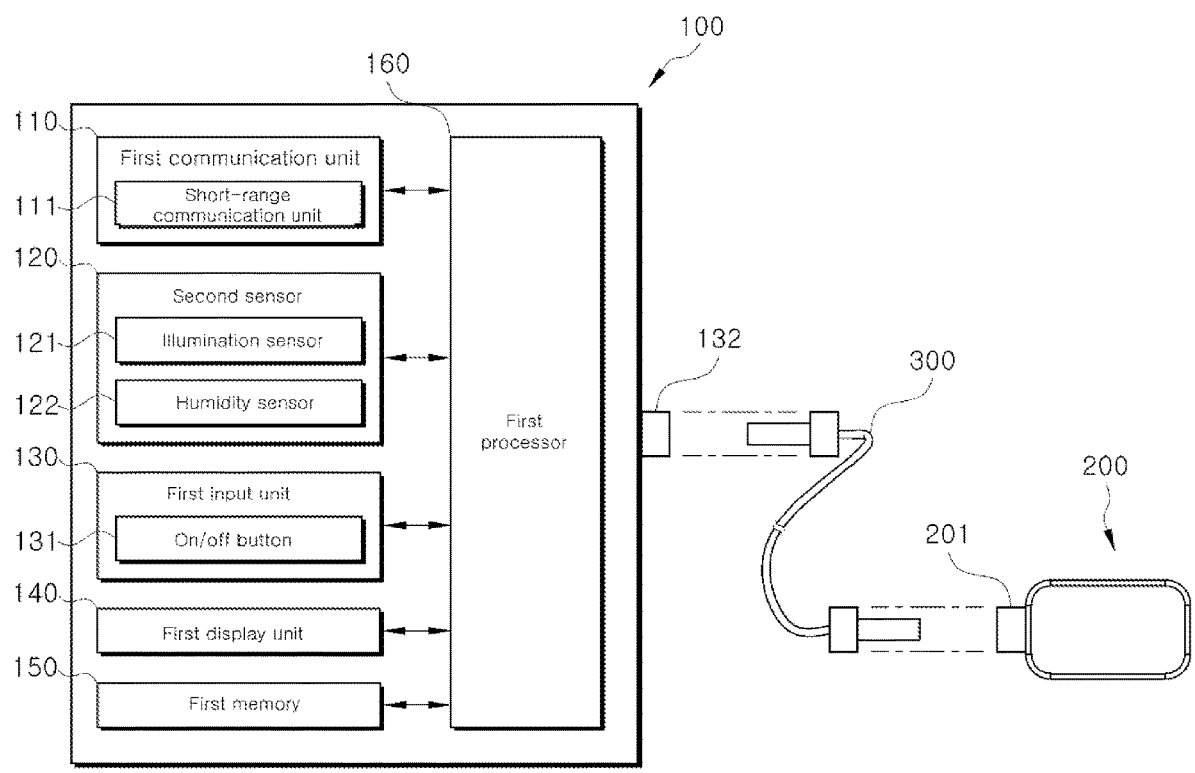

Furthermore, the first processor 160 may control at least a portion of the components described in conjunction with FIGS. 2 and 3 in order to drive application programs stored in the first memory 150. Moreover, the first processor 160 may combine and operate at least two or more of the components included in the apparatus 10 to drive the application programs.

In an embodiment, the first processor 160 may sense at least one of temperature, acceleration, humidity, illumination, inclination, shock, and location inside the region through the first sensor 200 installed inside the region in which the logistics are loaded, at each predetermined period. Additionally, the first processor 160 may accumulate and record actual sensed data generated at each predetermined period in a first QR code based on a preset storage capacity, and generate and display the first QR code based on the actual sensed data. In this instance, in a case in which the data included in the first QR code exceeds the preset storage capacity, the first processor 160 may generate a second QR code.

In other words, the first QR code may be changed and displayed whenever actual sensed data is accumulated until the data exceeds the preset storage capacity. That is, since the actual sensed data is accumulated and recorded in the first QR code at each predetermined period until the data reaches the preset storage capacity, the first QR code may be updated every point of time when the actual sensed data is accumulated and recorded. in other words, the first QR code may be variable as the actual sensed data is accumulated.

If the preset storage capacity is exceeded, the first QR code may be fixed based on the actual sensed data accumulated up to the preset storage capacity. Moreover, a second QR code may be newly generated. In this instance, the second QR code may be generated by accumulating the actual sensed data generated from the time when the preset storage capacity is exceeded. Therefore, from the point of time when the first QR code exceeds the preset storage capacity, the first QR code may not be variable, but the second QR code may be variable.

Thereafter, in a case in which the second QR code exceeds the preset storage capacity, a third QR code may be newly generated, and the actual sensed data may be accumulated and recorded in the third QR code. In other words, Such an operation may be repeatedly performed. Accordingly, the present invention can effectively provide a one-time QR (OTQ) based logistics state management service.

In addition, the QR codes generated as described above, namely, the first and second QR codes, may further include additional information as well as the actual sensed data. For example, the QR codes (the first and second QR codes) may further include at least one among authentication information and address information of a website providing a logistics state management service. Here, the QR code indicating the actual sensed data may be changed and displayed at each predetermined period, and the QR code indicating the authentication information or address information may be fixedly displayed regardless of the predetermined period. That is, since the actual sensed data is information that is newly generated and accumulated at each predetermined period, a QR code region indicating the authentication information or the address information of a website may be fixed, for instance, may be a region of fixed length data.

In addition, according to the embodiment, the first processor 160 may perform an authentication process for the external terminal 20 based on the authentication information included in the QR code. Here, the authentication information may include at least one among arrival location information of the logistics and arrival time information of the logistics. for example, the first processor 160 may generate an authentication request signal based on the authentication information included in the QR code, transmit the signal to the external terminal 20, and determine whether or not authentication is succeeded based on authentication information corresponding to the authentication request signal received from the external terminal 20. In a case in which the first processor 160 succeeds authentication, the corresponding QR code can be displayed.

Moreover, according to the embodiment, in a case in which the QR code reaches the preset storage capacity, the first processor 160 may reduce the storage capacity by compressing the actual sensed data accumulated and recorded in the QR code. For example, the first processor 160 may replace the actual sensed data with alternative sensed data based on a change amount of the actual sensed data and record the alternative sensed data in the QR code. Alternatively, the first processor 160 may replace the actual sensed data with alternative sensed data based on a pattern indicating the change amount of the actual sensed data and record the alternative sensed data in the QR code. Here, alternative sensed data is data with capacity smaller than that of the actual sensed data.

Accordingly, the apparatus 10 may store and manage data by reducing the capacity of data indicating the state information of the logistics. In addition, the apparatus 10 may contain more data in one page by compressing the state information stored in the form of a two-dimensional code, for instance, QR code or a bar code, thereby increasing efficiency of logistics-related work.

Furthermore, according to the embodiment, as described above, the first processor 160 may apply various compression encoding algorithms in accumulating and recording the actual sensed data in the QR code (the first and second QR codes) at each predetermined period. For instance, the first processor 160 may compress and encode the actual sensed data using a data compression algorithm, such as Delta-Hex encoding (DBH encoding) or Huffman encoding.

Here, delta encoding is an encoding method for compressing data by recording a difference between values adjacent to each other, and can be used for secondary data security when QR code data is decrypted. For example, the first processor 160 may convert and store the change amount of the actual sensed data into binary-type encrypted data, and can express the binary-type encrypted data in hexadecimal.

In addition, Huffman encoding is an encoding method for compressing data based on the frequency of character strings frequently used, and can be used to prevent decryption of QR code data. For example, the first processor 160 may identify character strings frequently used in the actual sensed data, and allocate signs having different lengths (e.g., different codes) according to the frequency of the character strings to compress and encode the actual sensed data.

In this instance, the first processor 160 may compress and encode the actual sensed data by applying at least one among delta encoding and Huffman encoding, and generate a QR code based on the compressed and encoded data. That is, the first processor 160 may compress and encode the actual sensed data by using at least one among delta encoding and Huffman encoding, or may compress and encode the actual sensed data by using both delta encoding and Huffman encoding.

Furthermore, according to the embodiment, the first processor 160 performs verification of the QR code generated as described above, and transmits the verified QR code to the server 30 according to the verification result to store the verified QR code in the server 30.

For instance, the QR code may further include information about usage time of the apparatus 10. In other words, the first processor 160 may record the actual sensed data sensed at each predetermined period in the QR code, and at the same time, record the actual usage time of the apparatus 10 in the QR code. In this case, it is possible to verify whether the QR code generated by the apparatus 10 is a normal QR code based on the information about the usage time of the apparatus 10 recorded in the QR code. Thereafter, in a case in which it is determined that the QR code is a normal QR code as the verification result, the QR code generated by the apparatus 10 may be uploaded and stored on the server 30.

In detail, the first processor 160 may generate a QR code including information about the usage time of the apparatus 10. Thereafter, in a case in which the generated QR code is recognized (e.g., in a case in which the generated QR code is photographed through the external terminal 20), the QR code may be transmitted to the server 30 through the external terminal 20. In this instance, the server 30 may compare the information about the usage time of the apparatus 10 recorded in the QR code with the information about predetermined usage time of the apparatus 10 based on the information about the usage time of the apparatus 10 recorded in the QR code. Here, the information about predetermined usage time of the apparatus 10 may be information previously stored on the server 30, or information about time that the apparatus 10 can be used. That is, the server 30 may determine the QR code as a normal QR code in a case in which the information about the usage time of the apparatus 10 recorded in the QR code and the information about predetermined usage time of the apparatus 10 match each other or correspond within predetermined usage time. Accordingly, the server 30 may store the QR code verified as a normal QR code.

In other words, the present invention can upload only the normal QR code on the server 30 and filter invalid QR codes by recording the information about the usage time of the apparatus 10 in the QR code and verifying the QR code based on the information. That is, the present invention can prevent unverified QR code, namely, unverified actual sensed data, from being uploaded on the system.

Additionally, according to the embodiment, the first processor 160 performs verification based on information about a release code of the apparatus 10 included in the QR code, and transmits the QR code verified according to the verification result to store the verified QR code on the server 30.

For example, the QR code may further include information about the release code of the apparatus 10. Here, the information on the release code of the apparatus 10 may be identification information given to the apparatus 10, may be allocated at the time the apparatus 10 is released, and may be recorded in the QR code.

As a specific example, the first processor 160 may generate a QR code including the information about the release code of the apparatus 10. Thereafter, in a case in which the generated QR code is recognized (e.g., in a case in which the generated QR code is photographed through the external terminal 20), the QR code may be transmitted to the server 30 through the external terminal 20. In this instance, the server 30 may compare the information about the release code of the apparatus 10 recorded in the QR code with the information about pre-stored release code based on the information about the release code of the apparatus 10 recorded in the QR code. Here, the pre-stored release code may be information previously stored on the server 30, and identification information unique to each device may be assigned at the time when each apparatus is released and stored in the server 30. That is, the server 30 may determine the QR code as a normal QR code when the information about the release code of the apparatus 10 recorded in the QR code and the information about the release code previously stored on the server 30 match each other. Accordingly, the server 30 may store the QR code verified as a normal QR code.

In other words, as described above, the present invention can filter only the normal QR code generated by the apparatus 10 by recording the information about the release code of the apparatus 10 in the QR code and verifying the QR code based on the information. That is, the present invention can identify whether the QR code is a normal QR code and verify the apparatus 10. That is, the present invention may perform a secondary security process by identifying the QR code before the QR code is reflected to the system, namely, the server.

Here, the QR code has a two-dimensional configuration that can record up to 7,089 numbers, up to 4,296 characters, and up to 1,817 Chinese characters using horizontal and vertical lines. The QR code may include all kinds of information, such as a long sentence internet address (URL), photographs, video information, map information, name card information, and the like.

Hereinafter, according to an embodiment, a method of replacing the actual sensed data with alternative sensed data and recording the alternative sensed data in a QR code will be described.

Through the first sensor 200 installed inside the region 3 where the logistics of the delivery vehicle 2 is loaded, the first processor 160 may generate actual sensed data sensing at least one among temperature, acceleration, humidity, illumination, inclination, shock, and location inside the region 3 at each predetermined period.

Here, the actual sensed data may be generated with respect to any one among temperature, acceleration, humidity, illumination, inclination, shock, and location, or may be generated by combining two or more thereamong.

In addition, the first processor 160 may calculate a change amount at each predetermined time interval with respect to the actual sensed data.

In addition, the predetermined time interval may be set depending on the type of a logistics loaded in the delivery vehicle 2. For example, when the type of a logistics is a vaccine, because the vaccine is sensitive to a temperature change, the first processor 160 may generate actual sensed data for temperature by setting a time interval so as to be shorter.

Figure 6:
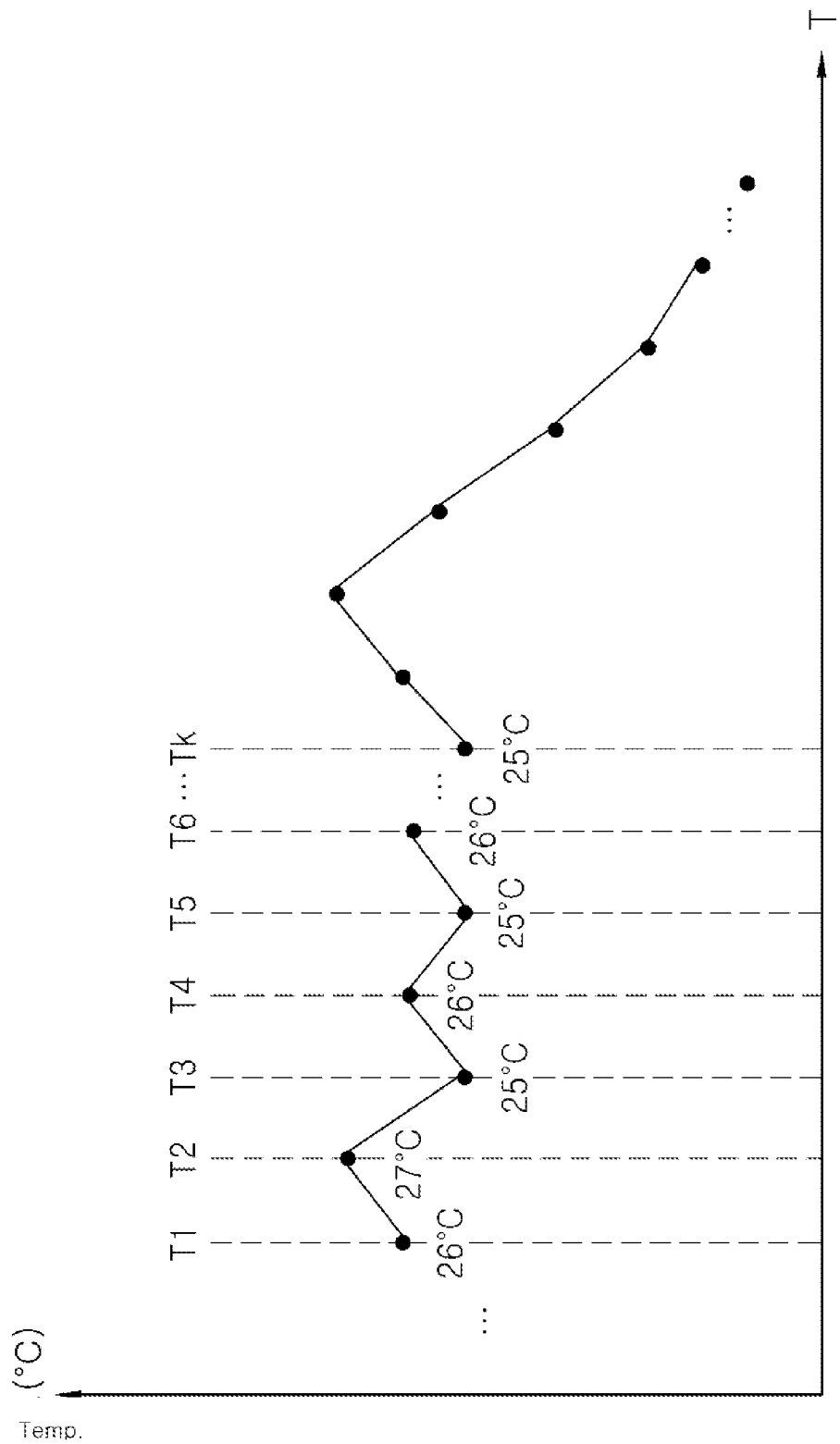
FIGS. 6 and 7 are views for depicting actual sensed data with respect to temperature according to the present invention.
Figure 7:
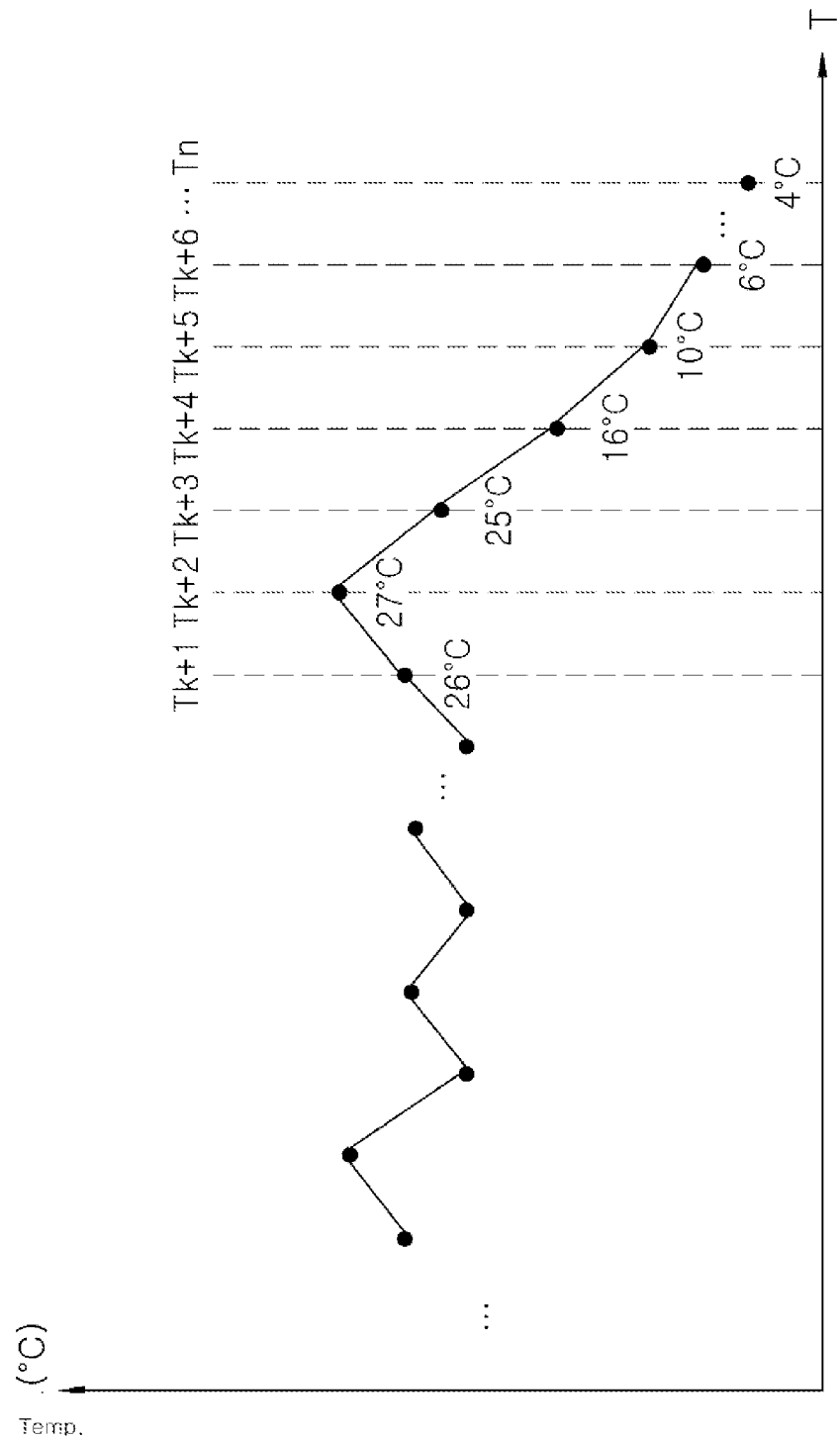

Referring to FIGS. 6 and 7, for example, the first processor 160 may generate actual sensed data for the temperature, which is obtained by sensing a temperature of the region 3 where the logistics of the delivery vehicle 2 is loaded, through the first sensor 200 at each predetermined period T.

Hereinafter, 'k' and 'n' described with reference to FIGS. 6 to 7 may be integers, and 'k' may be less than 'n'.

Here, the temperature sensed in $T\_1$ may be 26 degrees; the temperature sensed in $T\_2$ may be 27 degrees; the temperature sensed by $T\_3$ may be 25 degrees; the temperature sensed by $T\_4$ may be 26 degrees; the temperature sensed by $T\_5$ may be 25 degrees; the temperature sensed by $T\_6$ may be 26 degrees; and, the temperature sensed in $T\_k$ may be 25 degrees.

For example, the first processor 160 may convert the sensed temperature at each predetermined period into hexadecimal, may allocate 2 bytes to a hexadecimal number, and may store the converted result in the first memory 150.

Here, the temperature of 26 degrees sensed at $T\_1$ may be converted to a hexadecimal number of 0x1A; the temperature of 27 degrees sensed at $T\_2$ may be converted to a hexadecimal number of 0x1B; the temperature of 25 degrees sensed at $T\_3$ may be converted to a hexadecimal number of 0x19; the temperature of 26 degrees sensed at $T\_4$ may be converted to a hexadecimal number of 0x1A; the temperature of 25 degrees sensed at $T\_5$ may be converted to a hexadecimal number of 0x19; the temperature of 26 degrees sensed at $T\_6$ may be converted to a hexadecimal number of 0x1A; and, the temperature of 25 degrees sensed at $T\_k$ may be converted to a hexadecimal number of 0x19.

Afterward, the first processor 160 may calculate a change amount $D\_k$ of the actual sensed data for the temperature at the predetermined time interval.

Here, the predetermined time interval may be variously set to morning or afternoon, 6 hours, 4 hours, or the like. In FIG. 6, the predetermined time interval may include $T\_1$ to $T\_k$.

That is, with respect to the predetermined time interval of $T\_1$ to $T\_k$, the first processor 160 may calculate a first change amount $D\_1$ of +1 between the temperature of 26 degrees sensed at $T\_1$, and the temperature of 27 degrees sensed at $T\_2$; the first processor 160 may calculate a second change amount $D\_2$ of −2 between the temperature of 27 degrees sensed at $T\_2$, and the temperature of 25 degrees sensed at $T\_3$; the first processor 160 may calculate a third change amount $D\_3$ of +1 between the temperature of 25 degrees sensed at $T\_3$, and the temperature of 26 degrees sensed at $T\_4$; the first processor 160 may calculate a fourth change amount $D\_4$ of −1 between the temperature of 26 degrees sensed at $T\_4$, and the temperature of 25 degrees sensed at $T\_5$; the first processor 160 may calculate a fifth change amount $D\_5$ of +1 between the temperature of 25 degrees sensed at $T\_5$, and the temperature of 26 degrees sensed at $T\_6$; and, the first processor 160 may calculate a change amount "$D\_k-1$ ($=T\_k-T\_k-1$)" between the temperature sensed at $T\_k-1$, and the temperature of sensed at $T\_k$.

Referring to FIG. 7, the first processor 160 may generate actual sensed data for the temperature, which is obtained by sensing a temperature of the region 3 where the logistics of the delivery vehicle 2 is loaded, through the first sensor 200 at each predetermined period T.

Here, the temperature sensed at $T\_k+1$ may be 26 degrees; the temperature sensed at $T\_k+2$ may be 27 degrees; the temperature sensed at $T\_k+3$ may be 25 degrees; the temperature sensed at $T\_k+4$ may be 16 degrees; the temperature sensed at $T\_k+5$ may be 10 degrees; the temperature sensed at $T\_k+6$ may be 6 degrees; and, the temperature sensed at $T\_n$ may be 4 degrees.

For example, the first processor 160 may convert the sensed temperature at each predetermined period into hexadecimal, may allocate 2 bytes to a hexadecimal number, and may store the converted result in the first memory 150.

Here, the temperature of 26 degrees sensed at $T\_k+1$ may be converted to a hexadecimal number of 0x1A; the temperature of 27 degrees sensed at $T\_k+2$ may be converted to a hexadecimal number of 0x1B; the temperature of 25 degrees sensed at $T\_k+3$ may be converted to a hexadecimal number of 0x19; the temperature of 16 degrees sensed at $T\_k+4$ may be converted to a hexadecimal number of 0x10; the temperature of 10 degrees sensed at $T\_k+5$ may be converted to a hexadecimal number of 0x0A; the temperature of 6 degrees sensed at $T\_k+6$ may be converted to a hexadecimal number of 0x06; and, the temperature of 4 degrees sensed at $T\_n$ may be converted to a hexadecimal number of 0x04.

Afterward, the first processor 160 may calculate a change amount $D\_n$ of the actual sensed data for the temperature at the predetermined time interval.

Here, the predetermined time interval may be variously set to morning or afternoon, 6 hours, 4 hours, or the like. In FIG. 7, the predetermined time interval may include $T\_k+1$ to $T\_n$.

That is, with respect to the predetermined time interval of $T\_k+1$ to $T\_n$, the first processor 160 may calculate a $(k+1)$-th change amount $D\_k+1$ of +1 between the temperature of 26 degrees sensed at $T\_k+1$, and the temperature of 27 degrees sensed at $T\_k+2$; the first processor 160 may calculate a $(k+2)$-th change amount $D\_k+2$ of −2 between the temperature of 27 degrees sensed at $T\_k+2$, and the temperature of 25 degrees sensed at $T\_k+3$; the first processor 160 may calculate a $(k+3)$-th change amount $D\_k+3$ of −9 between the temperature of 25 degrees sensed at $T\_k+3$, and the temperature of 16 degrees sensed at $T\_k+4$; the first processor 160 may calculate a $(k+4)$-th change amount $D\_k+4$ of −6 between the temperature of 16 degrees sensed at $T\_k+4$, and the temperature of 10 degrees sensed at $T\_k+5$; the first processor 160 may calculate a $(k+5)$-th change amount $D\_k+5$ of −4 between the temperature of 10 degrees sensed at $T\_k+5$, and the temperature of 6 degrees sensed at $T\_k+6$; and, the first processor 160 may calculate a change amount $D\_n-1(=T\_n-T\_n-1)$ between the temperature sensed at $T\_n-1$, and the temperature sensed at $T\_n$.

The first processor 160 may activate one storage mode among the first storage mode and the second storage mode depending on the result of comparison between the change amount and a predetermined threshold change amount.

In detail, when the change amount is less than the threshold change amount, the first processor 160 may activate the first storage mode. When the change amount is greater than the threshold change amount, the first processor 160 may activate the second storage mode.

For example, the first processor 160 may compare the change amount of +1, −2, +1, −1, or 1 with a threshold change amount having a range of −8 to 7, or −7 to 8. When the change amount is small, the first processor 160 may activate the first storage mode.

That is, the first processor 160 may compare the change amount with the threshold change amount having a range of −8 to 7. When the change amount is smaller than the threshold change amount, the first processor 160 may activate the first storage mode.

As another example, the first processor 160 may compare the change amount of +1, −2, −9, −6, or −3 with a threshold change amount having a range of −8 to 7, or −7 to 8. Because a change amount of +1, −2, −6, or −3 is small, but a change amount of −9 is great, the first processor 160 may activate the second storage mode.

That is, the first processor 160 may compare the change amount with the threshold change amount having a range of −8 to 7. When the change amount is greater than the threshold change amount, the first processor 160 may activate the second storage mode.

Here, the threshold change amount may be −8 to 7, and may be 0111: 7, 0110: 6, 0101: 5, 0100: 4, 0011: 3, 0010: 2, 0001: 1, 0000: 0, 1111: −1 (complement), 1110: −2 (complement), . . . , 1001: −7 (complement), or 1000: −8 (complement).

First of all, the first storage mode may be a mode in which the actual sensed data is replaced with alternative sensed data including a pattern indicated by the change amount and then stored.

Here, the alternative sensed data may have a smaller capacity than the actual sensed data and may further include a time at which the actual sensed data is sensed.

Figure 8:
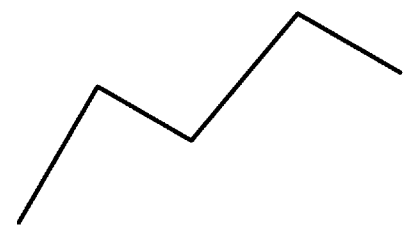
FIG. 8 is a view for depicting a pattern according to a change amount of the actual sensed data according to the present invention.
Figure 8:
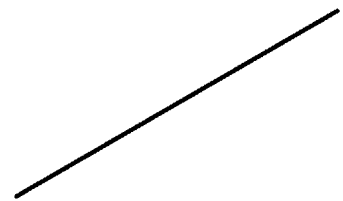
Figure 8:
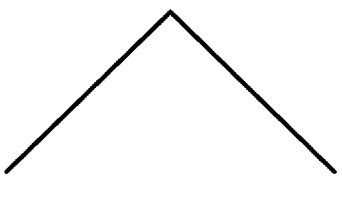
Figure 8:
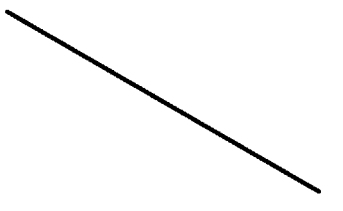

For example, referring to FIG. 8, a plurality of patterns for each change amount may include a first pattern, a second pattern, a third pattern to an N-th pattern. Identification information indicating the first pattern may be P1; identification information indicating the second pattern may be P2; identification information indicating the third pattern may be P3; and, identification information indicating the N-th pattern may be a PN.

Here, the plurality of patterns for each change amount may include a pattern in which the actual sensed data is maintained within a specific range in the corresponding time interval, or which is changed with regularity.

Moreover, the plurality of patterns for each change amount may be patterned based on values previously sensed at the same location (GPS information) and in the same time zone. The pattern for each of the plurality of change amount may be generated in a form of a table by assigning pattern identification information to each pattern for each of the plurality of change amount, and may be stored in the first memory 150 of the apparatus 10 in a firmware method.

For example, the plurality of patterns for each change amount may be generated based on factors such as the highest value of a change amount, the lowest value of the change amount, and the period of a waveform depending on the change amount calculated based on the previously sensed actual sensed data.

When the first storage mode is activated, the first processor 160 may identify a pattern corresponding to the change amount from among the plurality of patterns for each change amount stored in the first memory 150.

That is, the first memory 150 may store a table in which the corresponding identification information about a pattern indicating each of the plurality of change amounts is mapped onto the corresponding actual sensed data.

Moreover, the first processor 160 may identify identification information corresponding to the identified pattern among the pieces of identification information.

Moreover, the first processor 160 may store the actual sensed data in a storage method provided by the activated storage mode.

In detail, the first processor 160 may generate the alternative sensed data including the identified identification information based on the storage method provided by the activated first storage mode and then may store the alternative sensed data instead of the actual sensed data.

That is, the first processor 160 may search for a pattern corresponding to the change amount of the actual sensed data within the currently sensed interval in the table and then may replace and store alternative sensed data including identification information mapped onto the found pattern instead of storing the actual sensed data.

Here, for example, when the actual sensed data is stored in the storage method provided in the first storage mode, a bitstream included in a data structure is as follows.

First of all, a first bitstream BITSTREAM1 generated based on the change amount of the actual sensed data is as follows.

BITSTREAM1: {(initial value 1), D11, D12, . . . D(1)(n−1)}, {(initial value 2), D21, D22, . . . , D(2)(n−1)}, {third group}, . . . .

Accordingly, when the actual sensed data is stored as it is, the actual sensed data requires a capacity of "2 bytes×(k−1)". However, when the change amount is stored as described above, the capacity of the change amount may be reduced to a capacity of "1 byte×(k−1)".

Here, the first processor 160 may search for a pattern corresponding to the change amount of the actual sensed data and then may generate alternative sensed data including identification information mapped onto the found pattern instead of storing the actual sensed data.

The bitstream included in a data structure of the alternative sensed data will be described through the second bitstream or the third bitstream.

BITSTREAM2: {(initial value 1), P1, P2, P1}, {(initial value 2), P2, P1, P1}, {third group}, . . . .

BITSTREAM3: {(initial value 3), P3, P4, P5}, {(initial value 4), P5, P4, P5}

Accordingly, when the first bitstream BITSTREAM1 is compared with a second bitstream BITSTREAM2 or a third bitstream BITSTREAM3 described above, the size of data may be reduced from "1 byte×(k−1)" to "1 to 2 bytes".

Afterward, the server 30 may find and decode actual sensed data mapped onto an identifier of the alternative sensed data received from the apparatus 10 in the same table stored in the apparatus 10.

Accordingly, the apparatus 10 may reduce the storage capacity of the apparatus 10 by storing the alternative sensed data generated depending on the first storage mode instead of storing all the actual sensed data.

Next, the second storage mode may be a mode in which the actual sensed data is stored depending on the original capacity.

While the first storage mode is activated, when the change amount is greater than the threshold change amount, the first processor 160 may deactivate the first storage mode and may activate the second storage mode.

Moreover, the first processor 160 may store the actual sensed data in a storage method provided by the activated storage mode.

That is, the first processor 160 may store the actual sensed data depending on the original capacity based on the storage method provided by the activated second storage mode.

Here, for example, when the storage mode is changed from the first storage mode to the second storage mode, a fourth bitstream BITSTREAM4 included in a data structure when the actual sensed data is stored is as follows.

BITSTREAM4: {(initial value 5), P3, P4, break}, {(original value 1), (original value 2), (original value 3), . . . }

That is, referring to the fourth bitstream, when an original value is stored in a storage method according to the first storage mode before the fourth pattern P4 and then the change amount of the actual sensed data sensed after the fourth pattern P4 is greater than the threshold change amount, the original value may be stored in the storage method according to the second storage mode.

Afterward, when the predetermined time elapses while the second storage mode is activated, the first processor 160 may calculate a change amount of the actual sensed data sensed at a specific point in time and at the immediately next specific point in time after the predetermined period expires from the specific point in time.

Besides, when the change amount is less than the predetermined threshold change amount, the first processor 160 may deactivate the second storage mode and may activate the first storage mode.

On the other hand, when the change amount is greater than the predetermined threshold change amount, the first processor 160 may maintain the second storage mode during a predetermined time.

Here, the capacity of the first storage mode may be smaller than the capacity of the second storage mode. Afterward, when the first storage mode is activated, the first processor 160 may generate and display a two-dimensional code based on the alternative sensed data.

Here, the two-dimensional code may include a bar code or a QR code.

For example, a data structure at a point in time when the first processor 160 stores the actual sensed data or the alternative sensed data in a storage method provided in the activated storage mode will be described in detail below with reference to FIG. 9.

Figure 9:
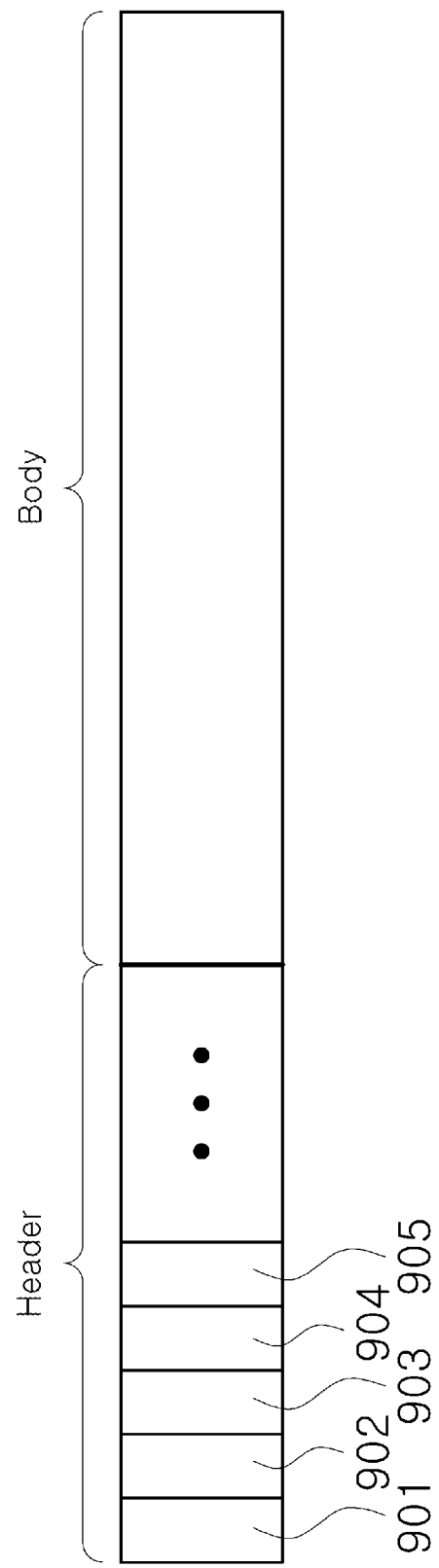
FIG. 9 is a view for depicting a data structure of alternative sensed data or the actual sensed data according to the present invention.

Referring to FIG. 9, the data structure may include a header and a body. Bits or bytes having a predetermined size may be allocated to the header and the body.

Here, the header may include a plurality of fields. Identification information indicating a storage mode may be recorded in a first field 901. Identification information indicating the start time and end time at which actual sensed data is sensed may be recorded in a second field 902. Also, identification information indicating a period sensed by the first sensor 200 or the second sensor 120 may be recorded in a third field 903. Moreover, identification information indicating a time interval for calculating a change amount of the actual sensed data may be recorded in a fourth field 904. Also, identification information indicating a location in a body of pattern identification information indicating a pattern may be recorded in a fifth field 905.

Besides, identification information indicating a sign (+ or −) of a change amount of the actual sensed data, identification information indicating the number of decimal places in the actual sensed data, and identification information indicating overflow determination criteria may be recorded in the header.

Such the information recorded in the header may include at least one, and the order may be changed.

Furthermore, at least one of first actual sensed data at a start time at which the actual sensed data is sensed, pattern identification information indicating a pattern, and the actual sensed data may be recorded in the body.

As such, at least one of information recorded in a field of the header may be recorded in the body, and information recorded in the body may be recorded in the header.

Moreover, when 4 bits are assigned to the body, because the most significant bit (MSB) of "1000" is "1", an overflow state may be detected.

The first processor 160 may generate a two-dimensional code based on the actual sensed data or the alternative sensed data and then may display the two-dimensional code on the screen of the first display unit 140. Here, the two-dimensional QR code may be converted and displayed on the screen depending on the order in which the QR codes are generated.

When the first processor 160 is connected to the first sensor 200 through the AUX cable 300, the first processor 160 may activate the first sensor 200 and may deactivate the second sensor 120.

Here, the first sensor 200 and the second sensor 120 may have different sensitivity level ranges from each other.

Accordingly, the first processor 160 may periodically receive a sensed result inside the region 3 from the activated first sensor 200 and then may generate the actual sensed data based on the sensed result received periodically.

Moreover, when the first processor 160 is paired with the external terminal 20 through the short-range communication unit 111, the first processor 160 may transmit the actual sensed data or the alternative sensed data, which is based on the sensed result of the activated one of the first sensor 200 and the second sensor 120, to the external terminal 20 in real time through short-distance communication.

When the external terminal 20 is paired, the first processor 160 may transmit the actual sensed data or the alternative sensed data to the external terminal 20 in real time. The first processor 160 may stop generating the two-dimensional code for the actual sensed data or the alternative sensed data.

Here, when pairing with the external terminal 20 is unpaired, the first processor 160 may resume the generating of the two-dimensional code on the first display unit 140.

Also, while the generating of the two-dimensional code is stopped, the first processor 160 may turn off the screen of the first display unit 140. Alternatively, while the generating of the two-dimensional code is stopped, the first processor 160 may display the two-dimensional code displayed at a point in time when the generating of the two-dimensional code is stopped.

Moreover, the first processor 160 may display a two-dimensional code indicating address information of a website providing a logistics state management service on the first display unit 140.

Here, the two-dimensional code indicating address information may be fixedly displayed on the first display unit 140.

Alternatively, the two-dimensional code indicating address information may be attached in a form of a sticker to the outside of the region 3 where the logistics of the delivery vehicle 2 is loaded.

Meanwhile, although the apparatus 10 illustrated in FIGS. 2 and 3 has been described as including the main body 100 and the first sensor 200, it is just an example, and the present invention is not necessarily limited thereto. According to embodiments, the apparatus 10 may be configured to include only the main body 100.

Figure 4:
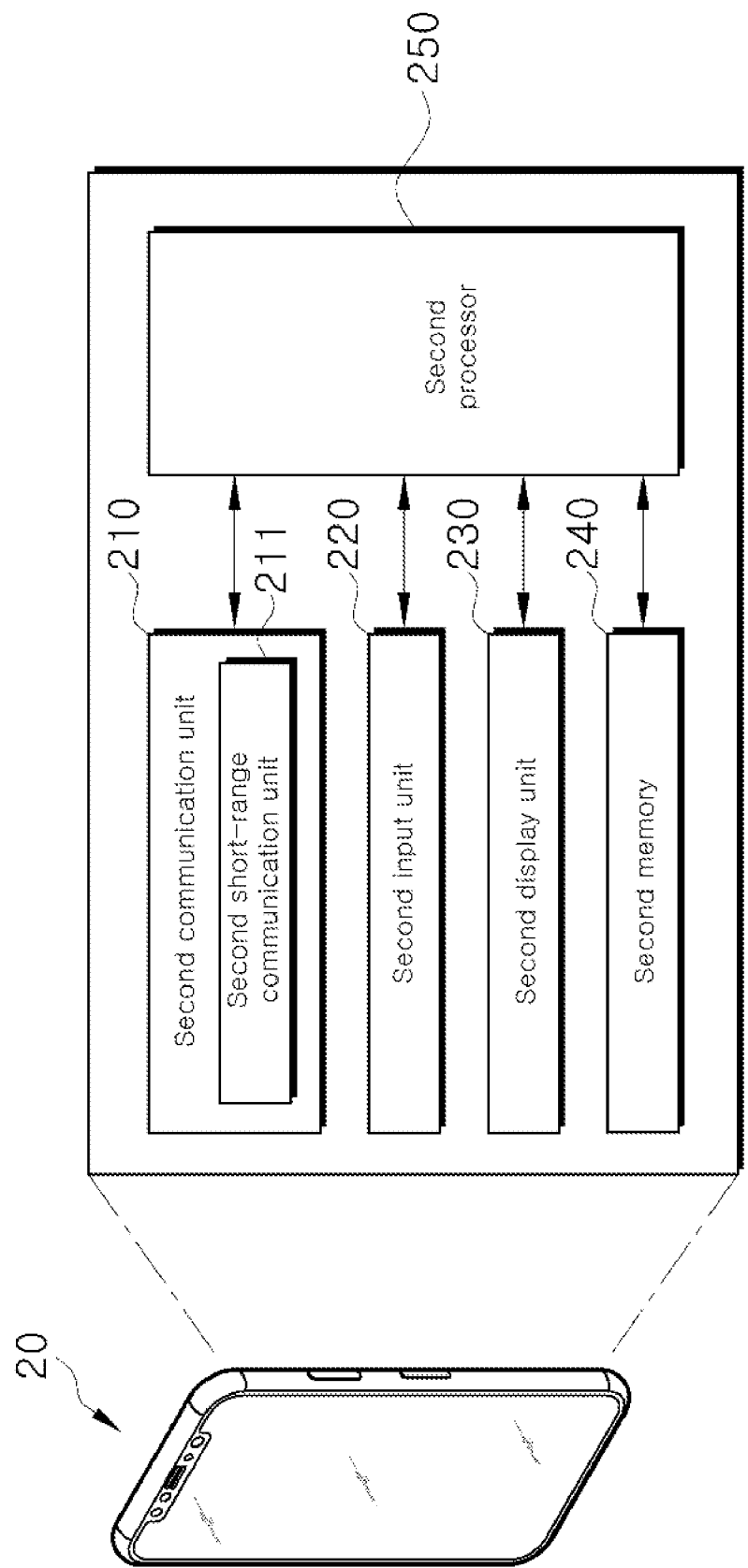
FIG. 4 is a view illustrating an external terminal 20 according to the present invention.

Next, the external terminal 20 will be described based on FIG. 4.

The external terminal 20 may be an electronic device capable of recognizing a two-dimensional code possessed by a delivery person who delivers logistics, a person in charge of managing logistics, or the like. Here, the external terminal 20 may include all kinds of handheld-based wireless communication devices, which are capable of being connected to a web server through a network, such as a mobile phone, a smartphone, a personal digital assistant (PDA), a portable multimedia player (PMP), a tablet PC, or the like.

The external terminal 20 may include a second communication unit 210, a second input unit 220, a second display unit 230, a second memory 240, and a second processor 250. Herein, the external terminal 20 may include fewer or more components than the components illustrated in FIG. 4.

The second communication unit 210 may include one or more modules that enable wireless communication between the external terminal 20 and a wireless communication system, between the external terminal 20 and the apparatus 10, between the external terminal 20 and the server 30, or between the external terminal 20 and an external server (not illustrated). Furthermore, the second communication unit 210 may include one or more modules connecting the external terminal 20 to one or more networks.

Moreover, the second communication unit 210 may further include a short-range communication unit 211 that performs low-power Bluetooth (Bluetooth™ Low Energy) communication with the apparatus 10.

The second input unit 220 may be used to enter image information (or signal), audio information (or signal), data, or information entered by a user. To enter image information, the external terminal 20 may include at least one camera on a front surface or a rear surface thereof.

Here, the camera may process an image frame such as a still image or a moving image, which is obtained by an image sensor in a video call mode or a shooting mode. The processed image frame may be displayed on the second display unit 230 or may be stored in the second memory 240.

In the meantime, the at least one camera provided in the external terminal 20 may be positioned to have a matrix structure. Pieces of image information having various angles or focal points may be entered into the external terminal 20 through the camera having the matrix structure in this manner.

Furthermore, the camera may be positioned in a stereo structure to obtain a left image and a right image for implementing a stereoscopic image.

Moreover, the camera may capture an image or video depending on a user's operation. Here, the camera may be a recognizer capable of capturing a QR code provided by the apparatus 10 depending on the user's operation.

The second input unit 220 may be used to receive information from the user. When the information is entered through the second input unit 220, the second processor 250 may control the operation of the external terminal 20 to correspond to the entered information.

The second input unit 220 may include a mechanical input means (or a mechanical key, for example, a button positioned on the front, rear, or side of the external terminal 20, a dome switch, a jog wheel, a jog switch, or the like) and a touch input means. For example, the touch input means may consist of a virtual key, a soft key, or a visual key displayed on a touch screen through software processing or may consist of a touch key positioned on a portion other than the touch screen. In the meantime, the virtual key or the visual key may be displayed on the touch screen while having various shapes. For example, the virtual key or visual key may be formed of graphics, texts, icons, video, or a combination thereof.

The second display unit 230 may have a mutual layer structure with the touch sensor or may be integrated with the touch sensor. Accordingly, the second display unit 230 may implement the touch screen. Such the touch screen may provide an input interface between the external terminal 20 and a user and may, at the same time, provide an output interface between the external terminal 20 and the user.

When the camera of the second input unit 220 recognizes a two-dimensional code provided by the apparatus 10, the second display unit 230 may display the recognized two-dimensional code and actual sensed data included in the recognized two-dimensional code.

The second memory 240 may store data for supporting various functions of the external terminal 20. The second memory 240 may store a plurality of application programs (or applications) running in the external terminal 20, data for an operation of the external terminal 20, and instructions. At least part of the application programs may be downloaded from an external server (not illustrated) through wireless communication. Moreover, at least part of these applications may be present for basic functions (e.g., an incoming and outgoing call function or an incoming and outgoing message function) of the external terminal 20. In the meantime, the application program may be stored in the second memory 240, may be installed in the external terminal 20, and may be driven by the second processor 250 so as to perform an operation (or function) of the external terminal 20.

In addition to an operation associated with the application program, the second processor 250 may generally control overall operations of the external terminal 20. The second processor 250 may provide or process appropriate information or functions to a user, by processing a signal, data, information, or the like, which is input or output through the above-described components, or driving the application program stored in the second memory 240.

Besides, the second processor 250 may control at least part of the components described with reference to FIG. 4 to operate the application program stored in the second memory 240. Furthermore, the second processor 250 may combine and operate at least two or more of the components included in the external terminal 20 to operate the application program.

The second processor 250 may transmit the two-dimensional code captured through the camera to the server 30.

That is, when the second processor 250 captures the two-dimensional code displayed on the apparatus 10 through the camera, the second processor 250 may transmit the two-dimensional code to the server 30.

Figure 5:
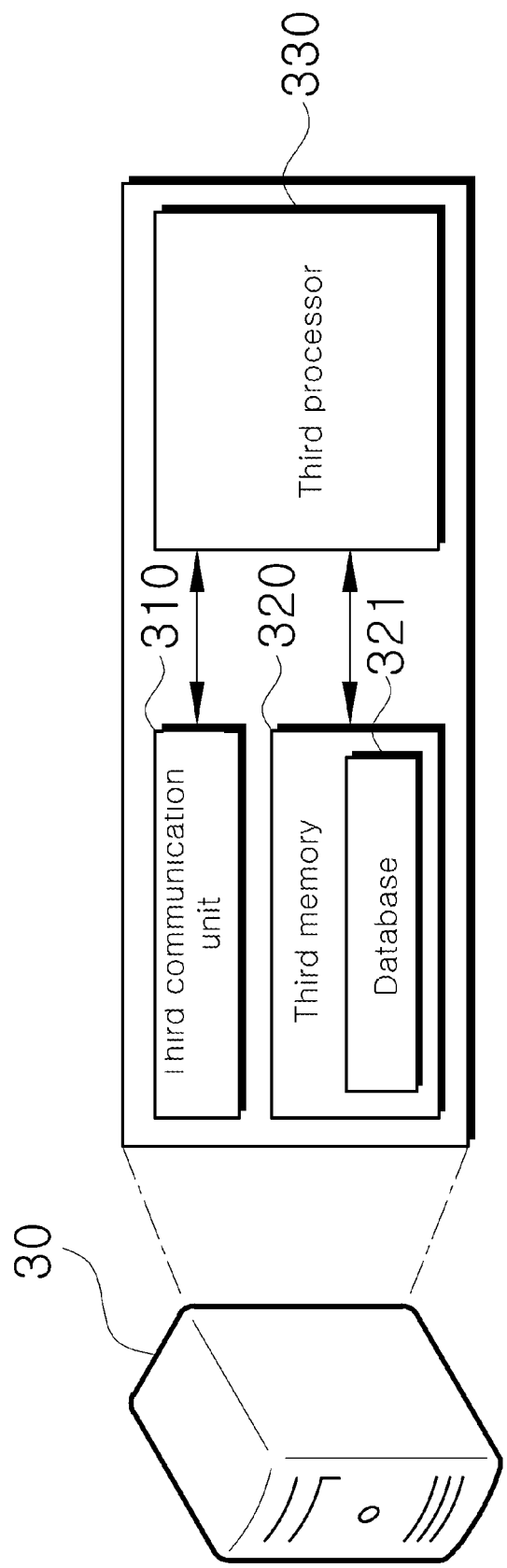
FIG. 5 is a view illustrating a server 30 according to the present invention.

Next, the server 30 will be described based on FIG. 5.

The server 30 may recognize the two-dimensional code in the captured image received from the external terminal 20 and then may recognize identification information in the recognized two-dimensional code.

Moreover, the server 30 may identify the recognized identification information among pre-stored pieces of identification information and then may search for the actual sensed data associated with the identified identification information.

Afterward, the server 30 may manage the state of the logistics based on the found result.

The server 30 may include all kinds of handheld-based wireless communication devices, which are capable of being connected to a web server through a network, such as a mobile phone, a smartphone, a personal digital assistant (PDA), a portable multimedia player (PMP), a tablet PC, or the like. In addition, the external device 30 may be one of digital devices, which are equipped with a memory means and which have computing power by mounting a microprocessor, such as a personal computer (e.g., a desktop computer, a notebook computer, or the like), a workstation, a PDA, a web pad, or the like.

The server 30 may include a third communication unit 310, a third memory 320, and a third processor 330. Herein, the server 30 may include fewer or more components than the components illustrated in FIG. 5.

The third communication unit 310 may include one or more modules that enable wireless communication between the server 30 and a wireless communication system, between the server 30 and the apparatus 10, between the server 30 and the external terminal 20, or between the server 30 and an external server (not illustrated). Furthermore, third communication unit 310 may include one or more modules connecting the server 30 to one or more networks.

The third memory 320 may store a plurality of application programs (or applications) running in the server 30, data for an operation of the server 30, and instructions. At least part of the application programs may be downloaded from an external server (not illustrated) through wireless communication. Besides, at least part of the application programs may be present for basic functions of the server 30. In the meantime, the application program may be stored in the third memory 320, may be installed in the server 30, and may be driven by the third processor 330 so as to perform an operation (or function) of the server 30.

Here, the third memory 320 may further include a database 321. The database 321 may store pieces of actual sensed data for respective identification information. That is, the database 321 may store a table in which the corresponding identification information about a pattern indicating each of the plurality of change amounts is mapped onto the corresponding actual sensed data.

In addition to an operation associated with the application program, the third processor 330 may generally control overall operations of the server 30. The third processor 330 may provide or process appropriate information or functions to a user, by processing a signal, data, information, or the like, which is input or output through the above-described components, or driving the application program stored in the third memory 330.

Besides, the third processor 330 may control at least part of the components described with reference to FIG. 5 to operate the application program stored in the third memory 320. Furthermore, the third processor 330 may combine and operate at least two or more of the components included in the server 30 to operate the application program.

The third processor 330 may recognize the two-dimensional code in the captured image received from the external terminal 20 and then may recognize identification information in the recognized two-dimensional code.

Here, the two-dimensional code may be generated based on the alternative sensed data generated while the first storage mode is activated.

The third processor 330 may identify the recognized identification information among pieces of identification information stored in the database 321 and then may search for the actual sensed data associated with the identified identification information.

In detail, the third processor 330 may search for the actual sensed data associated with the grasped identification information in a table, which is stored in the database 321 and which is the same as a table stored in the external terminal 20.

Afterward, the third processor 330 may manage the state of the logistics through the actual sensed data based on the found result.

That is, when it is determined, based on the actual sensed data of the logistics identified based on the found result, that the actual sensed data is out of a predetermined threshold range, the third processor 330 may generate a warning signal and may transmit the warning signal to the external terminal 20.

When the two-dimensional code captured through the camera is received from the external terminal 20, the third processor 330 may grasp actual sensed data included in a two-dimensional code, may generate a new two-dimensional code based on state information and time information at a point in time when the two-dimensional code is received, and may transmit the new two-dimensional code to the external terminal 20.

That is, the third processor 330 may generate the new two-dimensional code by excluding the actual sensed data sensed before that based on the time information, and then may transmit the new two-dimensional code to the external terminal 20.

Next, the external server (not illustrated) may refer to a device, which needs to receive state information in the delivery vehicle, such as a server that collectively manages logistics, a server of a producer that delivers the logistics, and a server of a customer that receives the logistics.

Alternatively, the external server (not illustrated) may be a device that provides a download of an application for providing a logistics state management service.

Here, the external server may include all kinds of handheld-based wireless communication devices, which are capable of being connected to a web server through a network, such as a mobile phone, a smartphone, a personal digital assistant (PDA), a portable multimedia player (PMP), a tablet PC, or the like. In addition, the external device 30 may be one of digital devices, which are equipped with a memory means and which have computing power by mounting a microprocessor, such as a personal computer (e.g., a desktop computer, a notebook computer, or the like), a workstation, a PDA, a web pad, or the like.

Next, the communication network 40 may transmit or receive various pieces of information between the apparatus 10, the external terminal 20, the server 30, and the external server (not illustrated). Various types of communication networks may be used. For example, wireless communication methods such as wireless LAN (WLAN), Wi-Fi, Wibro, Wimax, High Speed Downlink Packet Access (HSDPA), and the like or wired communication methods such as Ethernet, xDSL (ADSL or VDSL), Hybrid Fiber Coax (HFC), Fiber to The Curb (FTTC), Fiber to The Home (FTTH), and the like may be used in the communication network 40.

In the meantime, the communication network 40 is not limited to the communication method described above, and may include all types of communication methods widely known or to be developed in the future in addition to the above communication methods.

Hereinafter, a method for providing a one-time QR (OTQ) based logistics state management service according to the present invention will be described. The method according to the present invention can be performed by the system 1 described with reference to FIGS. 1 to 5.

Figure 10:
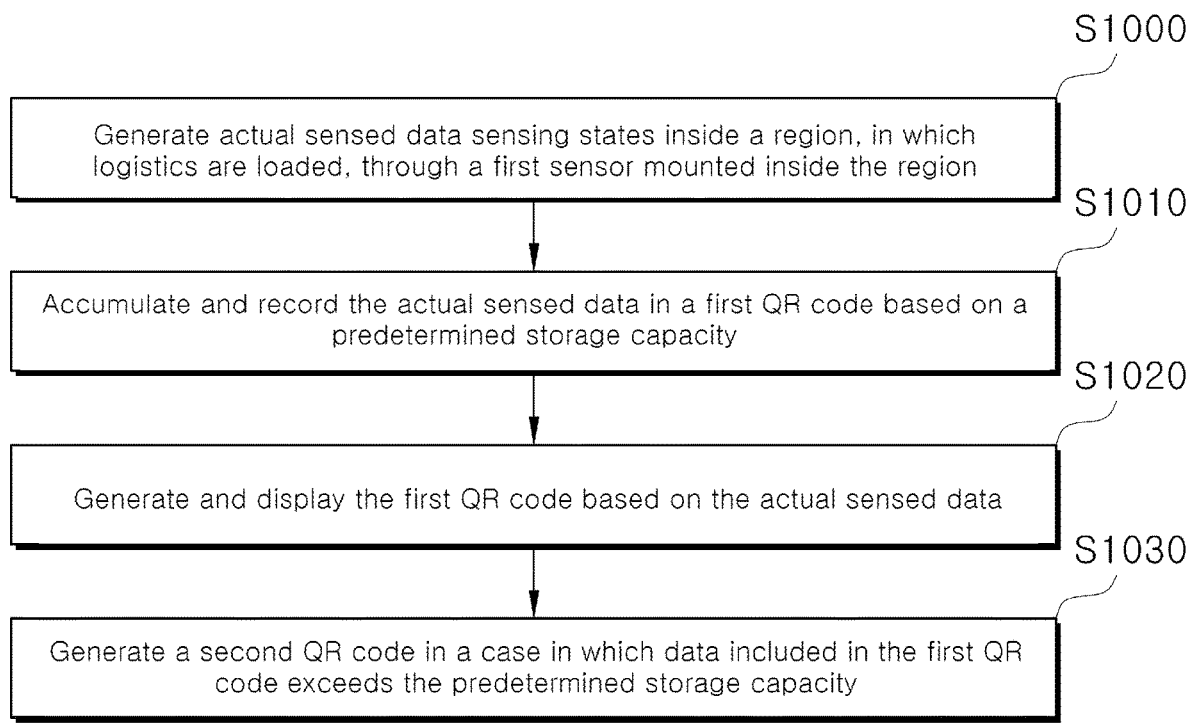
FIG. 10 is a flow chart illustrating a method for providing a one-time QR (OTQ) based logistics state management service according to an embodiment of the present invention.

FIG. 10 is a flow chart illustrating a method for providing a one-time QR (OTQ) based logistics state management service according to an embodiment of the present invention. Hereinafter, operations of the first processor 160 may be performed by the apparatus 10.

The first processor 160 may generate actual sensed data sensing a state inside a region 3 through a first sensor 200 mounted inside the region 3 where logistics are loaded (S1000).

Specifically, through the first sensor 200 installed inside the region 3 where the logistics of the delivery vehicle 2 is loaded, the first processor 160 may generate actual sensed data sensing at least one among temperature, acceleration, humidity, illumination, inclination, shock, and location inside the region 3 at each predetermined period.

The first processor 160 may accumulate and record the actual sensed data generated at each predetermined period in a first QR code based on preset storage capacity (S1010).

Additionally, the first processor 160 may generate and display the first QR code based on the actual sensed data (S1020).

Here, the first processor 160 may generate a second QR code in a case in which the data included in the first QR code exceeds the preset storage capacity (S1030).

That is, the first QR code may be changed and displayed whenever actual sensed data is accumulated until the data exceeds the preset storage capacity. That is, since the actual sensed data is accumulated and recorded in the first QR code at each predetermined period until the data reaches the preset storage capacity, the first QR code may be updated every point of time when the actual sensed data is accumulated and recorded. in other words, the first QR code may be variable as the actual sensed data is accumulated.

If the preset storage capacity is exceeded, the first QR code may be fixed based on the actual sensed data accumulated up to the preset storage capacity. Moreover, a second QR code may be newly generated. In this instance, the second QR code may be generated by accumulating the actual sensed data generated from the time when the preset storage capacity is exceeded. Therefore, from the point of time when the first QR code exceeds the preset storage capacity, the first QR code may not be variable, but the second QR code may be variable.

Thereafter, in a case in which the second QR code exceeds the preset storage capacity, a third QR code may be newly generated, and the actual sensed data may be accumulated and recorded in the third QR code. In other words, Such an operation may be repeatedly performed with respect to $3^{rd}$, $4^{th}$, . . . , and $N^{th}$ QR codes. Accordingly, the present invention can effectively provide a one-time QR (OTQ) based logistics state management service.

In addition, the QR codes generated as described above (e.g., $1^{st}$, second, . . . , and $N^{th}$ QR codes) may further include additional information as well as the actual sensed data. For example, the QR codes (e.g., $1^{st}$, second, . . . , and $N^{th}$ QR codes) may further include at least one among authentication information related to authentication of the external terminal and address information of a website providing a logistics state management service.

Here, the QR code indicating the actual sensed data may be changed and displayed at each predetermined period, and the QR code indicating the authentication information or address information may be fixedly displayed regardless of the predetermined period. That is, since the actual sensed data is information that is newly generated and accumulated at each predetermined period, a QR code region indicating the authentication information or the address information of a website may be fixed, for instance, may be a region of fixed length data.

As the states (e.g., temperature, acceleration, humidity, illumination, inclination, shock, location, and the like) of surrounding environment where the apparatus 10 is installed are changed, the apparatus 10 according to the present invention can generate a QR code by reflecting such state changes, thereby periodically checking and managing the states of the logistics in real time.

Although FIG. 10 illustrates operation S1030 being sequentially executed, it is only to exemplify the technical idea of this embodiment. Accordingly, it will be understood by the skilled persons in the art that the sequence of operations illustrated in FIG. 10 may be changed, or one or more operations selected from S1000 to S1030 may be executed in parallel without deviating from the essential characteristics of the present embodiment. That is, since various modifications and variations may be applied to this embodiment, FIG. 10 are not limited to the time sequential order.

Figure 11:
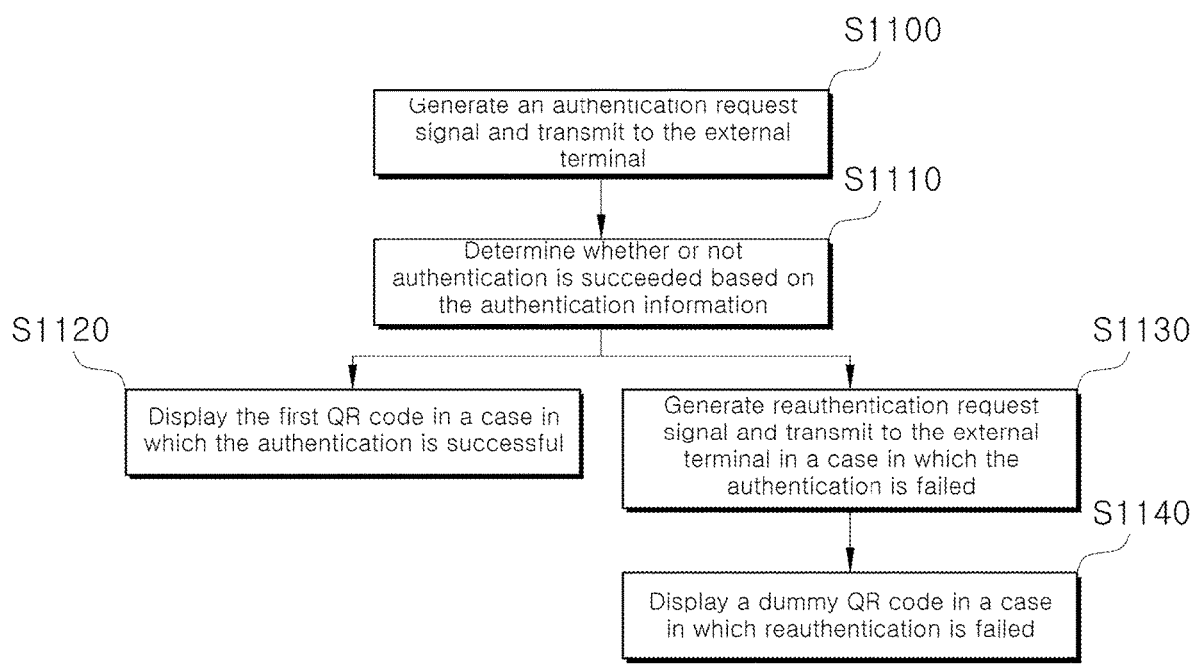
FIG. 11 is a flow chart illustrating an authentication process of the external terminal 20 in the method for providing a one-time QR (OTQ) based logistics state management service according to the present invention.

FIG. 11 is a flow chart illustrating an authentication process of the external terminal 20 in the method for providing a one-time QR (OTQ) based logistics state management service according to the present invention. The process of FIG. 11 may be performed in operation S1020 of FIG. 10, or may be performed before or after operation S1020.

The first processor may perform the authentication process for the external terminal 20 based on the authentication information included in the first QR code in a case in which the external terminal attempts to recognize the first QR code.

As described above, the first QR code may include authentication information as well as the actual sensed data. Here, the authentication information is information used to confirm whether the external terminal 20 attempting access to the QR code has access authority, and the authentication information may include at least one among location information (e.g., arrival location information of logistics) and time information (e.g., arrival time information of logistics).

In a case in which the external terminal attempts to recognize the first QR code, the first processor 160 may generate an authentication request signal based on the authentication information included in the first QR code and transmit the generated authentication request signal to the external terminal 20 (S1100).

Here, with respect to the recognition attempt of the external terminal 20, a proximity sensor of the sensor unit 120 can recognize access of the external terminal 20, a first camera 131 of the first input unit 130 can recognize the access of the external terminal 20, or an ultrasonic sensor or an infrared sensor of the sensor unit 120 can recognize the access of the external terminal 20.

The first processor 160 may determine whether authentication is successful or not based on the authentication information corresponding to the authentication request signal received from the external terminal 20 (S1110).

For example, the first processor 160 may generate an authentication request signal requesting location information (e.g., arrival location information of logistics) based on the authentication information included in the first QR code, and transmit the generated authentication request signal to the external terminal 20. In this instance, the external terminal 20 may generate the requested location information and transmit the location information to the first processor 160. For instance, the external terminal 20 may generate location information through a GPS module or a WiFi module in the terminal. Alternatively, the external terminal 20 may generate location information by receiving a receipt location of the logistics (namely, arrival location information of the logistics) from a user. The first processor 160 may determine whether authentication is successful or not by judging whether the location information received from the external terminal 20 matches the authentication information (e.g., arrival location information of the logistics) included in the first QR code.

Alternatively, for example, the first processor 160 may generate an authentication request signal requesting time information (e.g., arrival time information of logistics) based on the authentication information included in the first QR code, and transmit the generated authentication request signal to the external terminal 20. In this instance, the external terminal 20 may generate time information based on the date and time that the request signal was received. Alternatively, the external terminal 20 may generate time information by receiving the receipt time of the logistics from a user. The first processor 160 may determine whether authentication is successful or not by judging whether the time information received from the external terminal 20 matches the authentication information (e.g., arrival time information of the logistics) included in the first QR code.

According to embodiments, the authentication information may include identification information of the external terminal, and user information.

For instance, the first processor 160 may generate an authentication request signal requesting identification information of the external terminal based on the authentication information included in the first QR code, and transmit the generated authentication request signal to the external terminal 20. In this instance, the external terminal 20 may generate identification information of the external terminal and transmit the generated identification information to the first processor 160. Here, the identification information of the external terminal may include an identification code provided to the external terminal (namely, apparatus), user identification information of an application installed in the external terminal (e.g., account, password, and the like), and the like.

Additionally, the first processor 160 may generate an authentication request signal requesting user information of the external terminal based on the authentication information included in the first QR code, and transmit the generated authentication request signal to the external terminal 20. In this instance, the external terminal 20 may generate user information of the external terminal and transmit the generated user information to the first processor 160. Here, the user information may include fingerprint, iris, signature, and the like. For instance, the external terminal 20 may recognize a user's fingerprint through a fingerprint recognition sensor in the terminal, generate user authentication information based on the fingerprint recognition, and transmit the user authentication information to the first processor 160. Alternatively, the external terminal 20 may recognize a user's iris through the camera in the terminal, generate user authentication information based on the iris recognition, and transmit the user authentication information to the first processor 160. Alternatively, the external terminal 20 may receive a user's signature through the input unit in the terminal, generate user authentication information based on the received signature, and transmit the user authentication information to the first processor 160. According to embodiments, the fingerprint information and the iris information may be used to determine whether authentication is successful or not by recognizing the external terminal user's fingerprint and iris through the fingerprint recognition sensor 121 and the first camera 131 of the apparatus 10.

In addition, according to embodiments, the authentication information may use random numbers. For instance, the first processor 160 may generate an authentication request signal based on the authentication information (e.g., random number information) included in the first QR code, and transmit the generated authentication request signal to the external terminal 20. In this instance, the first processor 160 may generate random numbers and transmit the random numbers to the external terminal 20. The external terminal 20 may transmit the received random numbers to the first processor 160, and the first processor 160 may compare the received random numbers with random numbers generated by the first processor 160 to determine whether authentication is successful or not. In this instance, the random numbers may be generated in encoding.

In a case in which authentication is successful, the first processor 160 may represent the first QR code (S1120). That is, the first processor 160 may output the first QR code indicating actual sensed data.

Alternatively, in a case in which authentication is not successful, the first processor 160 may generate reauthentication requesting signal of the authentication information, and transmit it to the external terminal 20 (S1130).

In a case in which the reauthentication fails more than a predetermined number of times, the first processor 160 may generate a dummy QR code representing fake information, and then, provide the dummy QR code instead of the actual QR code to the external terminal 20 (S1140).

Alternatively, in a case in which the reauthentication fails more than a predetermined number of times, the first processor 160 may represent a predetermined image (e.g., access forbidden) instead of the actual QR code or lock the screen after turning off the screen displaying the QR code.

Although FIG. 11 illustrates operations S1100 to S1140 being sequentially executed, it is only to exemplify the technical idea of this embodiment. Accordingly, it will be understood by the skilled persons in the art that the sequence of operations illustrated in FIG. 11 may be changed, or one or more operations selected from S1100 to S1140 may be executed in parallel without deviating from the essential characteristics of the present embodiment. That is, since various modifications and variations may be applied to this embodiment, FIG. 11 are not limited to the time sequential order.

Figure 12:
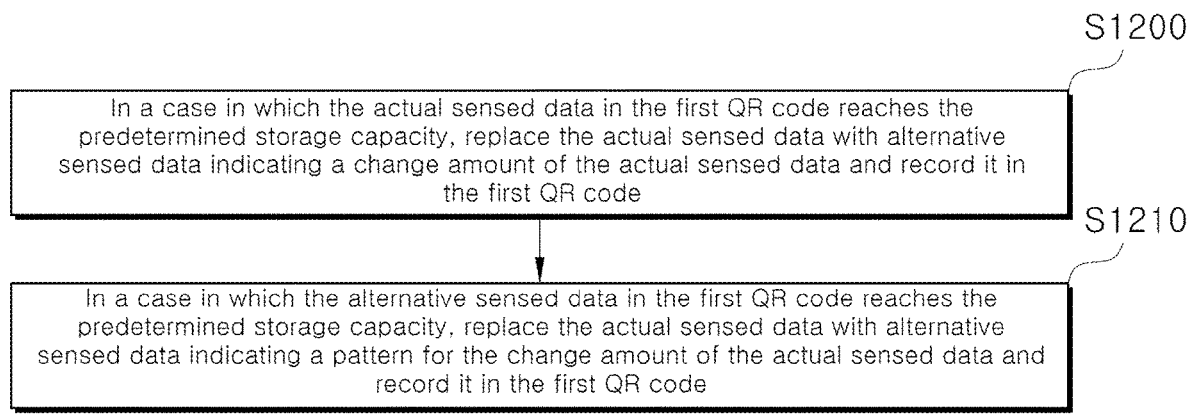
FIG. 12 is a flow chart illustrating an example of compressing and recording data in the QR code in the method for providing a one-time QR (OTQ) based logistics state management service according to the present invention.

FIG. 12 is a flow chart illustrating an example of compressing and recording data in the QR code in the method for providing a one-time QR (OTQ) based logistics state management service according to the present invention.

In a case in which the QR code reaches the preset storage capacity, the first processor 160 may reduce the storage capacity by compressing the actual sensed data accumulated and recorded in the QR code.

In an embodiment, in a case in which the QR code reaches the preset storage capacity, the first processor 160 may replace the actual sensed data with alternative sensed data based on a change amount of the actual sensed data and record the alternative sensed data in the QR code (S1200).

That is, the first processor 160 may record the alternative sensed data indicating the change amount of the actual sensed data, instead of the actual sensed data, in the QR code. In this instance, the alternative sensed data may be expressed as the number of bits smaller than that of the actual sensed data and may have reduced capacity since being data indicating the change amount of the actual sensed data. That is, the alternative sensed data may have capacity smaller than that of the actual sensed data so as to reduce and store data capacity.

Specifically, the first processor 160 may calculate the change amount of actual sensed data at each predetermined period. In this instance, in a case in which the change amount is less than the threshold change amount, the first processor 160 may replace the actual sensed data with alternative sensed data and record the alternative sensed data in the QR code.

Meanwhile, in a case in which the change amount is more than the threshold change amount, the first processor 160 may record the actual sensed data in the first QR code.

In a case in which the alternative sensed data in the first QR code reaches a predetermined storage capacity, the first processor 160 may replace the actual sensed data with alternative sensed data indicating a pattern of the change amount of the actual sensed data based on the pattern of the change amount of the actual sensed data, and record it in the first QR code (S1210).

Specifically, the first memory 150 may store a plurality of identification information indicating patterns for a plurality of change amounts. That is, the first memory 150 may store a table in which the corresponding identification information about a pattern indicating each of the plurality of change amounts is mapped onto the corresponding actual sensed data.

The first processor 160 may identify the pattern corresponding to the change amount among the patterns for the plurality of change amounts, and identify identification information corresponding to the identified pattern among lots of identification information. In addition, the first processor 160 may generate the alternative sensed data including the identified identification information, and record the alternative sensed data including the identification information instead of the actual sensed data in the first QR code.

In this instance, the alternative sensed data may be expressed as the number of bits smaller than the information indicating the change amount of the actual sensed data since being information indicating the pattern of the change amount of the actual sensed data (i.e., information representing the identification information of the pattern for the change amount). Therefore, the alternative sensed data may have capacity smaller than that of operation S1200. Accordingly, there is an effect of compressing and storing actual sensed data twice.

Although FIG. 12 illustrates operations S1200 to S1210 being sequentially executed, it is only to exemplify the technical idea of this embodiment. Accordingly, it will be understood by the skilled persons in the art that the sequence of operations illustrated in FIG. 12 may be changed, or one or more operations selected from S1200 to S1210 may be executed in parallel without deviating from the essential characteristics of the present embodiment. That is, since various modifications and variations may be applied to this embodiment, FIG. 12 are not limited to the time sequential order.

Meanwhile, according to embodiments, the method for providing a one-time QR (OTQ) based logistics state management service according to the present invention may provide a method for improving compression and security of actual sensed data.

In other words, as mentioned above, the first processor 160 may compress and encode actual sensed data based on a predetermined data compression algorithm (e.g., delta encoding, or Hoffman encoding) and record it in the QR code. Additionally, the first processor 160 may perform verification on the QR code generated as described above, and according to the verification result, transmit the verified QR code to the server 30 so that the verified QR code can be stored on the server 30.

In an embodiment, the first processor 160 may apply delta encoding to the actual sensed data sensed by the sensor 200 at the predetermined period. In other words, the first processor 160 may calculate a change amount (namely, variation) of the actual sensed data sensed by the sensor 200 at the predetermined period, and convert the change amount in a binary form.

For instance, as illustrated in FIGS. 6 and 7, the first processor 160 may generate actual sensed data for the temperature, which is obtained by sensing a temperature of the region 3 where the logistics of the delivery vehicle 2 is loaded, through the first sensor 200 at each predetermined period T. Here, the temperature sensed in $T\_1$ may be 26 degrees; the temperature sensed in $T\_2$ may be 27 degrees; the temperature sensed by $T\_3$ may be 25 degrees; the temperature sensed by $T\_4$ may be 26 degrees; the temperature sensed by $T\_5$ may be 25 degrees; the temperature sensed by $T\_6$ may be 26 degrees; and the temperature sensed in $T\_k$ may be 25 degrees.

Hereinafter, the first processor 160 may calculate the change amount $D\_k$ at predetermined time intervals $T\_1$ to $T\_k$ with respect to the actual sensed data for the temperature. That is, the first processor 160 may calculate the change amount $D\_k$ at the predetermined time intervals $T\_1$ to $T\_k$ with respect to the actual sensed data for the temperature. In other words, the first processor 160 may calculate: a first change amount $D\_1$ of +1 between the temperature of 26 degrees sensed at $T\_1$, and the temperature of 27 degrees sensed at $T\_2$; a second change amount $D\_2$ of −2 between the temperature of 27 degrees sensed at $T\_2$, and the temperature of 25 degrees sensed at $T\_3$; a third change amount $D\_3$ of +1 between the temperature of 25 degrees sensed at $T\_3$, and the temperature of 26 degrees sensed at $T\_4$; a fourth change amount $D\_4$ of −1 between the temperature of 26 degrees sensed at $T\_4$, and the temperature of 25 degrees sensed at $T\_5$; a fifth change amount $D\_5$ of +1 between the temperature of 25 degrees sensed at $T\_5$, and the temperature of 26 degrees sensed at $T\_6$; and a change amount "$D\_k-1$ (=$T\_k$-$T\_k-1$)" between the temperature sensed at $T\_k-1$, and the temperature of sensed at $T\_k$.

That is, the first processor 160 may convert the calculated change amounts of +1, −2, +1, −1, and −2 into binary forms. For instance, the change amount of +1 may be converted into 0001, the change amount of −1 may be converted into 1111 in a complement form, and −2 may be converted into 1110 in a complement form.

In addition, the first processor 160 may apply Huffman encoding to the actual sensed data after applying delta encoding. That is, the first processor 160 may calculate the change amounts of the actual sensed data as described above, convert them into the binary form, and then, allocate signs having different lengths (e.g., different codes) according to the frequency of the character strings to compress and encode the actual sensed data. For instance, the first processor 160 may allocate a longer code to a smaller value (e.g., −1) based on the change amounts (e.g., +1, −2, +1, −1, and −2) of the actual sensed data and allocate a shorter code to a higher value (e.g., −1).

The first processor 160 may apply Huffman encoding to the change amount of the actual sensed data, generate compressed and encoded data, and record it in the QR code.

Next, as described above, the first processor 160 may perform verification based on information on usage time of the apparatus 10 with respect to the QR code by applying delta encoding and Huffman encoding.

For instance, the first processor 160 may generate a QR code including information about the usage time of the apparatus 10. Thereafter, in a case in which the generated QR code is recognized (e.g., in a case in which the generated QR code is photographed through the external terminal 20), the QR code may be transmitted to the server 30 through the external terminal 20. In this instance, the server 30 may compare the information about the usage time of the apparatus 10 recorded in the QR code with the information about predetermined usage time of the apparatus 10 based on the information about the usage time of the apparatus 10 recorded in the QR code. Here, the information about predetermined usage time of the apparatus 10 may be information previously stored on the server 30, or information about time that the apparatus 10 can be used. That is, the server 30 may determine the QR code as a normal QR code in a case in which the information about the usage time of the apparatus 10 recorded in the QR code and the information about predetermined usage time of the apparatus 10 match each other or correspond within predetermined usage time. Accordingly, the server 30 may store the QR code verified as a normal QR code.

Next, as described above, the first processor 160 may perform verification based on information on the release code of the apparatus 10 with respect to the QR code by applying delta encoding and Huffman encoding. Here, the information on the release code of the apparatus 10 may be identification information given to the apparatus 10, may be allocated at the time the apparatus 10 is released, and may be recorded in the QR code.

For instance, the first processor 160 may generate a QR code including the information about the release code of the apparatus 10. Thereafter, in a case in which the generated QR code is recognized (e.g., in a case in which the generated QR code is photographed through the external terminal 20), the QR code may be transmitted to the server 30 through the external terminal 20. In this instance, the server 30 may compare the information about the release code of the apparatus 10 recorded in the QR code with the information about pre-stored release code based on the information about the release code of the apparatus 10 recorded in the QR code. Here, the pre-stored release code may be information previously stored on the server 30, and identification information unique to each device may be assigned at the time when each apparatus is released and stored in the server 30. That is, the server 30 may determine the QR code as a normal QR code when the information about the release code of the apparatus 10 recorded in the QR code and the information about the release code previously stored on the server 30 match each other. Accordingly, the server 30 may store the QR code verified as a normal QR code.

In the present invention according to the above-described embodiment, the first processor 160 may effectively reduce the storage capacity of QR code data by recording compressed data, to which delta encoding and Huffman encoding are applied, in the QR code instead of actual sensed data. Furthermore, the apparatus 10 may contain more data in one page by compressing the state information stored in the form of a two-dimensional code, for instance, QR code or a bar code In addition, the present invention can further record the information about usage time and information about the release code of the apparatus 10 and perform verification on the QR code based on the information, thereby uploading only the verified normal QR code on the system, namely, server, enhancing reliability of the QR code, and reinforcing a security aspect.

Meanwhile, as described above, the present invention may replace the actual sensed data with alternative sensed data and record the alternative sensed data in the QR code or may compress and encode actual sensed data based on a predetermined data compression algorithm (e.g., delta encoding, or Hoffman encoding) and record it in the QR code.

In this instance, according to embodiments, the method of replacing the actual sensed data with alternative sensed data and the method of compressing and encoding the actual sensed data based on the predetermined data compression algorithm (e.g., delta encoding, or Hoffman encoding) may be all applied or may be applied in combination.

For instance, the first processor 160 of the apparatus 10 may calculate the change amount at the predetermined period with respect to the actual sensed data sensed by the first sensor 200 of the apparatus 10. In this instance, in a case in which the calculated change amount is less than a predetermined threshold change amount, the first processor 160 may replace the actual sensed data with alternative sensed data. Thereafter, the first processor 160 may apply a predetermined data compression algorithm (e.g., delta encoding, or Hoffman encoding) to the alternative sensed data, compress and encode the alternative sensed data, and record the compressed and encoded data in the QR code. Alternatively, in a case in which the calculated change amount is more than a predetermined threshold change amount, the first processor 160 may record the actual sensed data in the QR code as it is, and as occasion demands, may apply the predetermined data compression algorithm (e.g., delta encoding, or Hoffman encoding) to the actual sensed data, and record the compressed and encoded data in the QR code.

As described above, the present invention can sense at least one of temperature, acceleration, humidity, illumination, inclination, shock, and location within a region 3 where the logistics are loaded in a delivery vehicle delivering the logistics, and provide the state information of the logistics in the form of a QR code. Accordingly, in a case in which a user has a terminal and the corresponding application capable of recognizing the QR code and a corresponding application, the present invention can easily recognize the QR code without a cumbersome process. Therefore, the present invention can easily, accurately and conveniently confirm the state in the delivery vehicle 2 and take necessary measures.

Moreover, the present invention can enhance efficiency by facilitating an integrated logistics state management service through simplification of the process of checking the state in the delivery vehicle, and minimize issue of paper certificates, such as certified documents or inspection reports, and the likes, that had to be submitted during the distribution process.

Furthermore, the present invention can generate a QR code by reflecting state changes as the states, e.g., temperature, acceleration, humidity, illumination, inclination, shock, location, etc., in the delivery vehicle are changed, thereby being effective in checking and managing the states of logistics in real time or periodically.

In addition, the present invention can contain more data in one page and increase efficiency in logistics-related work by compressing the state information stored in the form of a QR code.

The method according to an embodiment of the present disclosure can be implemented as a program (or application) to be executed by being combined with a computer which is hardware, and can be stored in a medium.

The program may include code coded as a computer language, such as C, C++, Java, machine language, etc. which a processor (CPU) of the computer can read through a device interface of a computer. The code may include a functional code associated with a function that defines necessary functions for executing the methods, and may include an execution procedure-related control code in which the processor of the computer needs to execute the functions according to predetermined procedures. In addition, the code may further include additional information necessary for the processor of the computer to execute the functions or memory reference-related code for whether the media should be referenced in which location (address) of the internal or external memory of the computer. Moreover, if communication with any other computer or server in a remote location is required to execute the functions by the process of the computer, the code may further include communication-related code for how to communicate with any other computer or server at a remote location using the communication module of the computer, or whether or not any information or media should be transmitted and received in the communication.

The method or algorithm described in relation to the embodiments of the present disclosure can be directly embodied in hardware, can be embodied in a software module executed by hardware, or can be embodied by combination thereof. The software module can reside in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

The apparatus 10, the terminal 20, and the server 30 described in the present disclosure may include various devices capable of performing arithmetic processing to provide results to a user. For example, the apparatus 100 according to an embodiment of the present disclosure may include all of a computer, a server device, and a portable terminal, or may adopt any one thereamong.

Here, the computer may include, for example, a notebook computer equipped with a web browser, a desktop, a laptop, a tablet PC, a slate PC, and the like.

The server device is a server for processing information by performing communication with the external device, and includes an application server, a computing server, a database server, a file server, a game server, a mail server, a proxy server, a web server, and the like.

The portable terminal is a wireless communication device providing portability and mobility, and includes all kinds of handheld-based wireless communication devices, such as a personal communications system (PCS), a global system for mobile communications (GSM), a personal digital cellular (PDC), a personal handphone system (PHS), a personal digital assistant (PDA), an international mobile telecommunications (IMT)-2000, a code division multiple access (CDMA)-2000, a W-code division multiple access (W-CDMA), wireless broadband internet (WiBro) terminal, a smartphone, and the like, and a wearable device, such as a watch, a ring, a bracelet, an ankle bracelet, a necklace, glasses, contact lenses, or a head-mounted device (HMD).

On the other hand, the disclosed embodiments may be implemented in the form of a recording medium storing instructions executable by a computer. Instructions may be stored in the form of program code and, when executed by a processor, may generate a program module to perform the operation of the disclosed embodiments. The recording medium may be embodied as a computer-readable recording medium.

The computer readable recording medium includes all kinds of recording media in which instructions that can be decrypted by a computer are stored. For example, there may be a read-only memory (ROM), a random access memory (RAM), a magnetic tape, a magnetic disk, a flash memory, an optical data storage device, and the like.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

The invention claimed is:

1. A method for providing a one-time QR (OTQ) based logistics state management service, which is performed by an apparatus, comprising:
generating actual sensed data sensing at least one among temperature, acceleration, humidity, illumination, inclination, shock, and location inside a region, in which logistics are loaded, at each predetermined period through a first sensor mounted inside the region;
accumulating and recording the actual sensed data generated at each predetermined period based on a predetermined storage capacity;
generating and displaying a first QR code based on the actual sensed data; and
generating a second QR code in a case in which data included in the first QR code exceeds the predetermined storage capacity,
wherein the first QR code is changed whenever the actual sensed data is accumulated until the data exceeds a preset storage capacity, and
wherein in a case in which data included in the first QR code exceeds the predetermined storage capacity, the first QR code is fixedly displayed based on the actual sensed data accumulated up to the predetermined storage capacity, and the actual sensed data generated from a point of time of exceeding the preset storage capacity is accumulated and generated in the second QR code.

2. The method according to claim 1, wherein the first QR code further includes at least one among authentication information and address information of a web site providing the logistics state management service,
wherein the first QR code indicating the actual sensed data is changed and displayed at each predetermined period, and
wherein the first QR code indicating the authentication information and the address information is fixedly displayed regardless of the predetermined period.

3. The method according to claim 2, wherein in a case in which an external terminal attempts to recognize the first QR code, further comprising:
performing an authentication process of the external terminal based on the authentication information included in the first QR code, and
wherein the authentication information is at least one among arrival location information of the logistics and arrival time information of the logistics.

4. The method according to claim 3, wherein performing the authentication process of the external terminal comprises:
   generating an authentication request signal based on the authentication information included in the QR code, and transmitting the signal to the external terminal;
   determining whether or not authentication is succeeded based on the authentication information corresponding to the authentication request signal received from the external terminal; and
   displaying the first QR code in a case in which the authentication is successful.

5. The method according to claim 1, wherein in a case in which the first QR code reaches the predetermined storage capacity, further comprising:
   replacing the actual sensed data with alternative sensed data based on a change amount of the actual sensed data and recording it in the first QR code, and
   wherein the alternative sensed data is smaller in capacity than the actual sensed data.

6. The method according to claim 5, wherein replacing the actual sensed data with alternative sensed data based on a change amount of the actual sensed data and recording it in the first QR code comprises:
   calculating a change amount of the actual sensed data at each predetermined period;
   replacing the actual sensed data into alternative sensed data and recording the alternative sensed data in the first QR code in a case in which the change amount is smaller than a predetermined threshold change amount; and
   recording the actual sensed data in the first QR code in a case in which the change amount is larger than a predetermined threshold change amount.

7. The method according to claim 5, wherein the alternative sensed data includes a pattern indicating the change amount of the actual sensed data, and
   further comprising:
   replacing the actual sensed data with alternative sensed data based on the pattern indicating the change amount of the actual sensed data and recording the alternative sensed data in the first QR code.

8. The method according to claim 5 wherein the apparatus stores a number of identification information indicating a number of patterns for change amounts, identifies a pattern corresponding to the change amount among lots of patterns for the change amounts, identifies identification information corresponding to the identified pattern, generates the alternative sensed data including the identification information, and records the alternative sensed data including the identification information instead of the actual sensed data in the first QR code.

9. A non-transitory computer-readable recording medium storing program for implementing the method for providing a one-time QR (OTQ) based logistics state management service according to claim 1, in combination with a computer which is hardware.

10. An apparatus for providing a one-time QR (OTQ) based logistics state management service comprising:
   a first sensor mounted in a region, in which logistics are loaded, to sense at least one among temperature, acceleration, humidity, illumination, inclination, shock, and location inside at each predetermined period; and
   a processor,
   wherein the processor generates actual sensed data according to sensing results of the first sensor, accumulates and records the actual sensed data generated at each predetermined period based on a predetermined storage capacity, generates and displays a first QR code based on the actual sensed data, and generates a second QR code in a case in which data included in the first QR code exceeds the predetermined storage capacity,
   wherein the first QR code is changed whenever the actual sensed data is accumulated until the data exceeds a preset storage capacity, and
   wherein in a case in which data included in the first QR code exceeds the predetermined storage capacity, the first QR code is fixedly displayed based on the actual sensed data accumulated up to the predetermined storage capacity, and the actual sensed data generated from a point of time of exceeding the preset storage capacity is accumulated and generated in the second QR code.

* * * * *